United States Patent [19]

Baraglia et al.

[11] 4,409,734

[45] Oct. 18, 1983

[54] HARNESS MAKING APPARATUS AND METHOD

[75] Inventors: Nathan A. Baraglia, Algonquin; Robert Eitzinger, Lincolnshire; Kimber T. Vought, Wauconda, all of Ill.

[73] Assignee: AMP Incorporated, Harrisburg, Pa.

[21] Appl. No.: 235,407

[22] Filed: Feb. 18, 1981

[51] Int. Cl.³ ........................ H01R 43/04; B23P 19/00

[52] U.S. Cl. ........................................ 29/861; 29/749; 29/564.4; 29/759

[58] Field of Search .............. 29/749, 759, 564, 564.1, 29/564.4, 564.6, 857, 861, 863; 81/9.51

[56] References Cited

U.S. PATENT DOCUMENTS 3,267,556 8/1966 Scharf ............................ 29/564.4 X
3,872,584 3/1975 Chick et al. ................... 29/564.4 X
4,043,017 8/1977 Folk et al. .
4,043,034 8/1977 Sucheski et al. .
4,043,494 8/1977 Bickford et al. .
4,087,908 5/1978 Fusco et al. ...................... 29/759 X
4,136,440 1/1979 Brandewie et al. .
4,164,808 8/1979 Gudmestad .
4,235,015 11/1980 Funcik et al. .

*Primary Examiner*—Francis S. Husar
*Assistant Examiner*—Carl J. Arbes
*Attorney, Agent, or Firm*—Frederick W. Raring

[57] ABSTRACT

Electrical harness manufacturing apparatus comprises wire feeding means for feeding wires along a wire feed path through upstream and downstream (relative to the direction of wire feed) wire guides. The guides have opposed ends which are adjacent to each other during feeding. The guides thereafter move apart so that fed wires are exposed in a gap between the opposed ends. A transferring device clamps the wires in the gap and wire cutting means are provided to cut the wires adjacent to the transferring means, thereby producing leads having their trailing ends gripped in the transferring means. The transferring means transfers the trailing ends laterally of the feed path to a wire connecting station at which the trailing ends are connected to terminals in a connector. Insulation can be stripped, if desired, from the trailing ends of the cut leads and from the leading ends of the wires extending from the feed means.

23 Claims, 19 Drawing Figures

HARNESS MAKING APPARATUS AND METHOD

FIELD OF THE INVENTION

This invention relates to electrical harness making methods and apparatus of the type having feeding means for feeding a plurality of wires, cutting means for cutting the fed wires, and wire connecting or terminating means for connecting the ends of the wires to terminals in a connector. The embodiment disclosed produces harnesses having a connector at one end thereof; however, the principles of the invention can be used in machines capable of producing harnesses having connectors at each end thereof.

BACKGROUND OF THE INVENTION

It has become common practice in the electrical industry to produce electrical harnesses by means of semiautomatic or fully automatic harness making machines of the general types shown, for example in U.S. Pat. Nos. 4,136,440, 4,043,017, and 4,235,015. Machines of the general type shown in these U.S. patents have a wire feeding means in the form of a reciprocable shuttle which pulls wires from endless wire sources, such as barrels or reels, and presents the leading ends of the wires directly to a connecting or terminating station at which the ends of the wires are connected to terminals in a multi-contact electrical connector. U.S. Pat. No. 4,136,440 also shows wire cutting means and insulation stripping means for stripping the ends of the wires, while U.S. Pat. No. 4,043,017 shows a second connecting or terminating station for connecting trailing ends of the wires to terminals in a second connector. U.S. Pat. No. 4,136,440 also shows a mechanism on a harness making machine for producing harnesses having leads of varying lengths, rather than leads of uniform lengths, extending from the connector which is installed on the leading ends of the wires. Leads of varying lengths in the finished harness are produced, in accordance with the teachings of the U.S. Pat. No. 4,136,440, by lengthening members which move against the wires laterally of their axes and from loops in the individual wires to produce varying lengths as required in the harness.

Harness making machines of the type described above are receiving widespread acceptance in the electrical industry and are constantly being improved to permit added operations on the connector and wires during manufacture, to permit the use of connectors having terminals on increasingly closer centers, and in general, to improve the reliability and speed of these machines. The present invention is directed to the achievement of an improved harness making machine which is capable of operating at a relatively high speed, which has improved wire feeding means, and which has an improved means for producing leads of varying lengths in the finished harness. The invention is further directed to the achievement of a machine which is relatively compact and which has the capability of stripping insulation from both ends of the leads of the harness. By virtue of this feature, a harness making machine in accordance with the invention can be equipped with terminal crimping means so that terminals are crimped onto the ends of the wires.

A preferred embodiment of the invention comprises wire feeding means in the form of individual feed rolls for each of the wires in the completed harness. The individual sets of feed rolls are controlled by a controlling means, as disclosed in U.S. Pat. No. 4,043,494 (which is hereby incorporated by reference in its entirety) in a manner such that leads of varying lengths can be produced during a single operating cycle. The wires are fed from the sources through upstream and downstream wire guides which have opposed ends that are against each other during at least the initial portion of the feeding operation. These wire guides are moved apart so that portions of the fed wires are exposed in the gap which is formed between the opposed ends of the guides. A transfer device is provided which moves into this gap adjacent to the downstream wire guide and grips the wires at the end of the feeding portion of the cycle. The wires are cut by cutting blades which are located in the gap between the wire guides and thereafter the trailing ends of the resulting leads, that is portions of the wires extending downstream from the plane of cutting, are transferred to a wire connecting station. A connector is then installed on the trailing ends by a connecting means which connects the wires to terminals in the connector. The wire cutters are contained in a die set and, if desired, insulation cutters can also be mounted in the die set on each side of the wire cutters so that the insulation of the trailing ends of the leads is cut, as well as the insulation on the leading ends of the wires extending from the feed rolls. The die set and the upstream wire guide are capable of moving relative to the cut ends of the leads and wires in a way which will permit stripping of the trailing ends of the leads and the leading ends off the wires.

BRIEF DESCRIPTION OF THE DRAWINGS

FIG. 11 is a view looking in the direction of the arrows 11—11 in FIG. 13.

DETAILED DESCRIPTION OF THE PREFERRED EMBODIMENT

Figure 8:
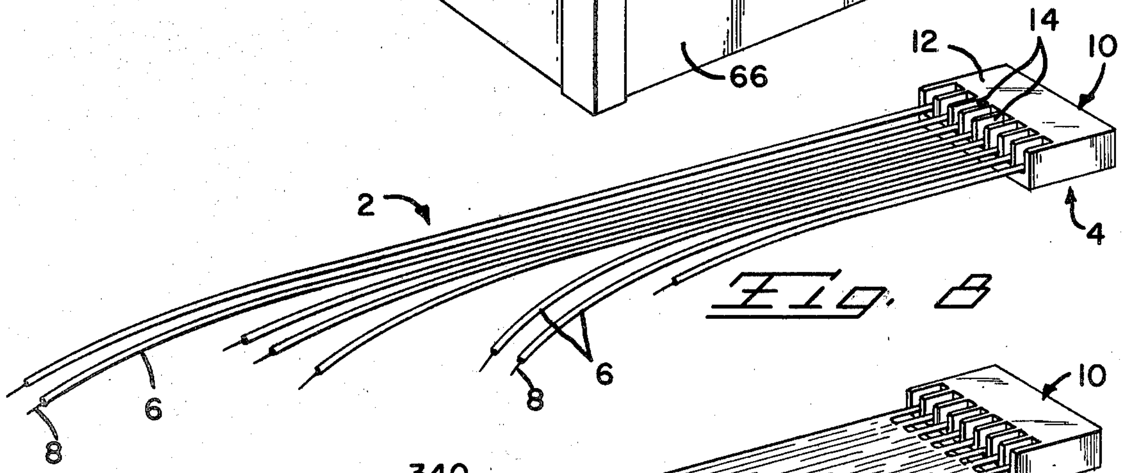
FIG. 8 is a perspective view of a finished harness produced by the method and apparatus of the disclosed embodiment.

The disclosed embodiment of the invention is designed to produce electrical harnesses 2, FIG. 8, having a connector 4 and a plurality of individual lead wires 6, the ends 8 of which are stripped as shown. The connector 4 comprises a rectangular insulating housing 10 having an upper surface 12 onto which terminal receiving cavities 14 open. The cavities contain electrical contact terminals which are arranged in side-by-side relationship in a row extending between the ends of the housing 10. The terminals may be of the type having wire receiving slots at their rearward ends so that wires can be connected to the terminals by moving the wires laterally of their axes and into the rearward portions 14 of the cavities and into the slots in the terminals.

In the description which follows, the operating principles of the disclosed apparatus and the method steps which are followed will first be described with reference to FIGS. 1–7 which show the essential structural features of the apparatus in semi-diagrammatic form. This description of the operating principles will be followed by a detailed description of the preferred form of apparatus and shown in the following Figures of the drawing.

OPERATING PRINCIPLES—FIGS. 1–7

The wires 16 for the completed harness 2 are fed from substantially endless sources, such as barrles or reels, by means of wire feeding means 18 along a feed path which extends through fixed guide tubes 20, movable guide tubes 22, and through a wire cutting zone shown at 24. The feeding means 18 is preferably of the type shown in the above identified U.S. Pat. No. 4,043,494 and comprises individual sets of feed rolls, one set for each wire which is fed through the apparatus. The individual sets of feed rolls are controlled by a control means which permits the feeding of varying lengths of wires during the feeding cycle so that the leads 6 in the finished harness can be of varying lengths.

The movable guide tubes 22 are telescopically received within the fixed guide tubes 20 so that these movable guides tubes can be moved relatively towards and away from the feed roll assembly 18. The wire feed path extends convergently, as shown at 23, through a normally open wire clamp 52, through an upstream wire guide 26, through a downstream wire guide 28, and then beyond the end of the downstream wire guide. The terms "upstream" and "downstream" are used herein with reference to the direction of feed of the wire along the wire feed path.

Figure 1:
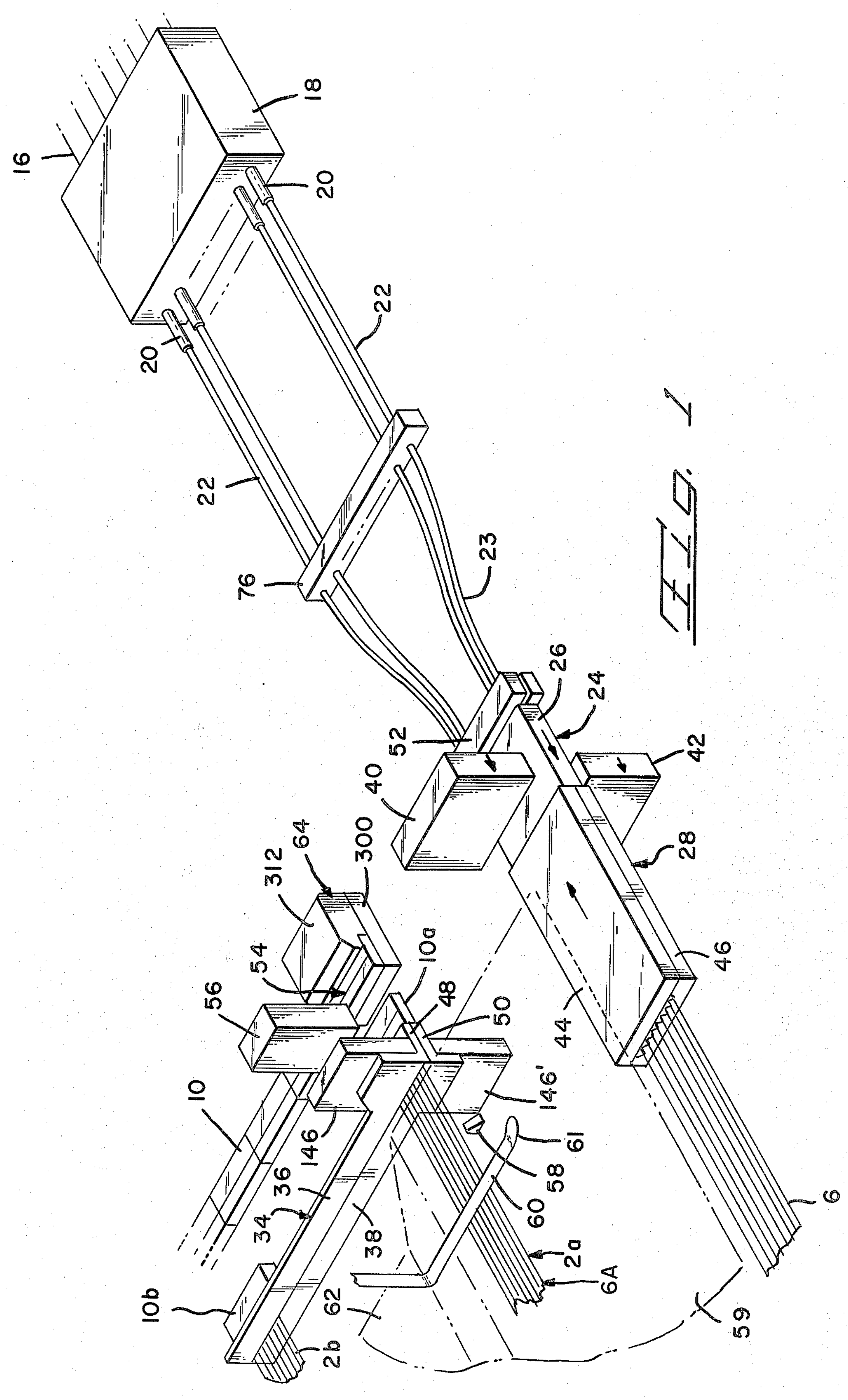
FIG. 1 is a perspective view in diagrammatic form showing the essential elements of an apparatus in accordance with the invention, this view showing the positions of the parts at the beginning of an operating cycle.
Figure 2:
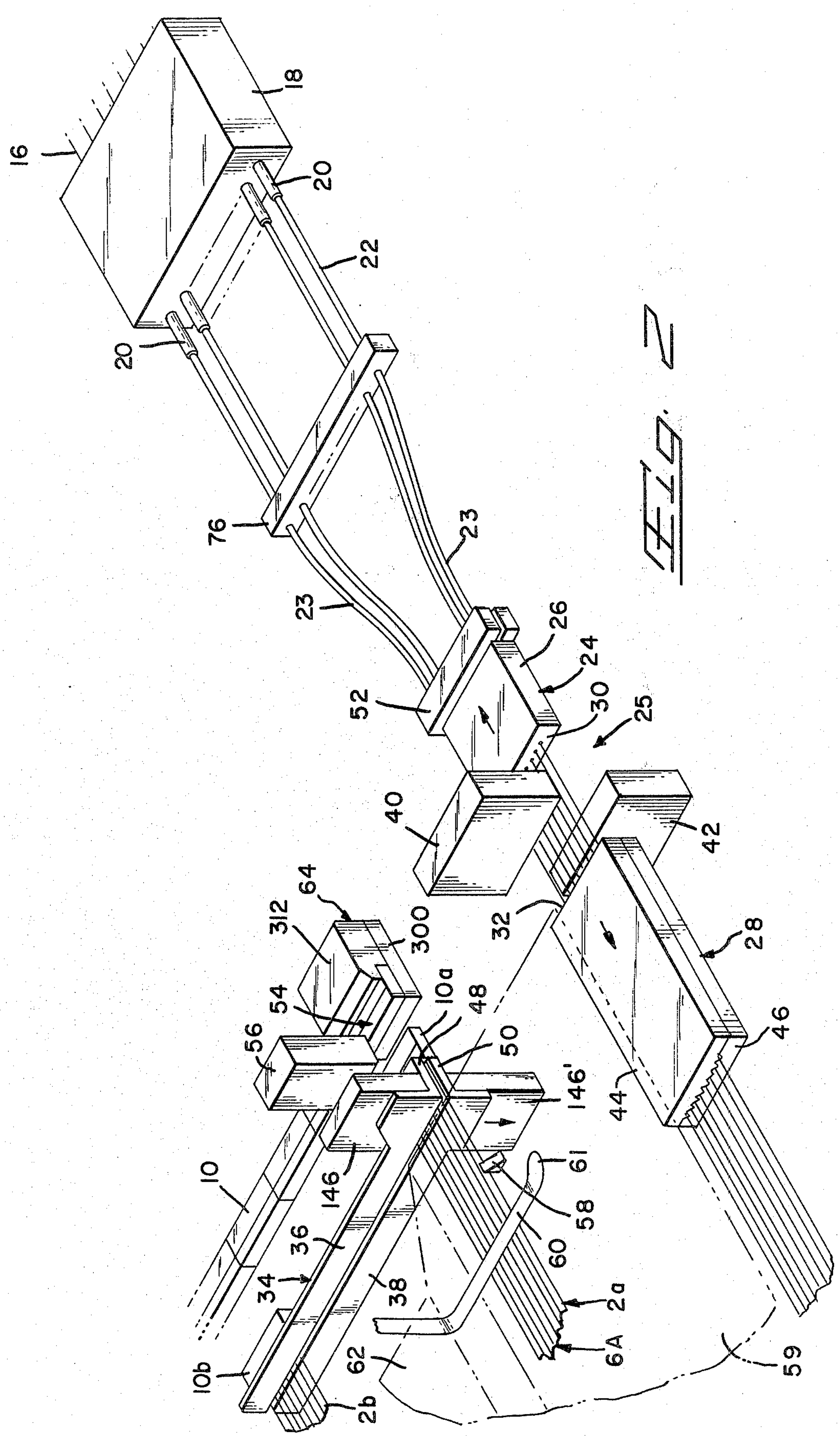
FIGS. 2–7 are views similar to FIG. 1, showing the positions of the parts at successive stages of the operating cycle.
Figure 3:
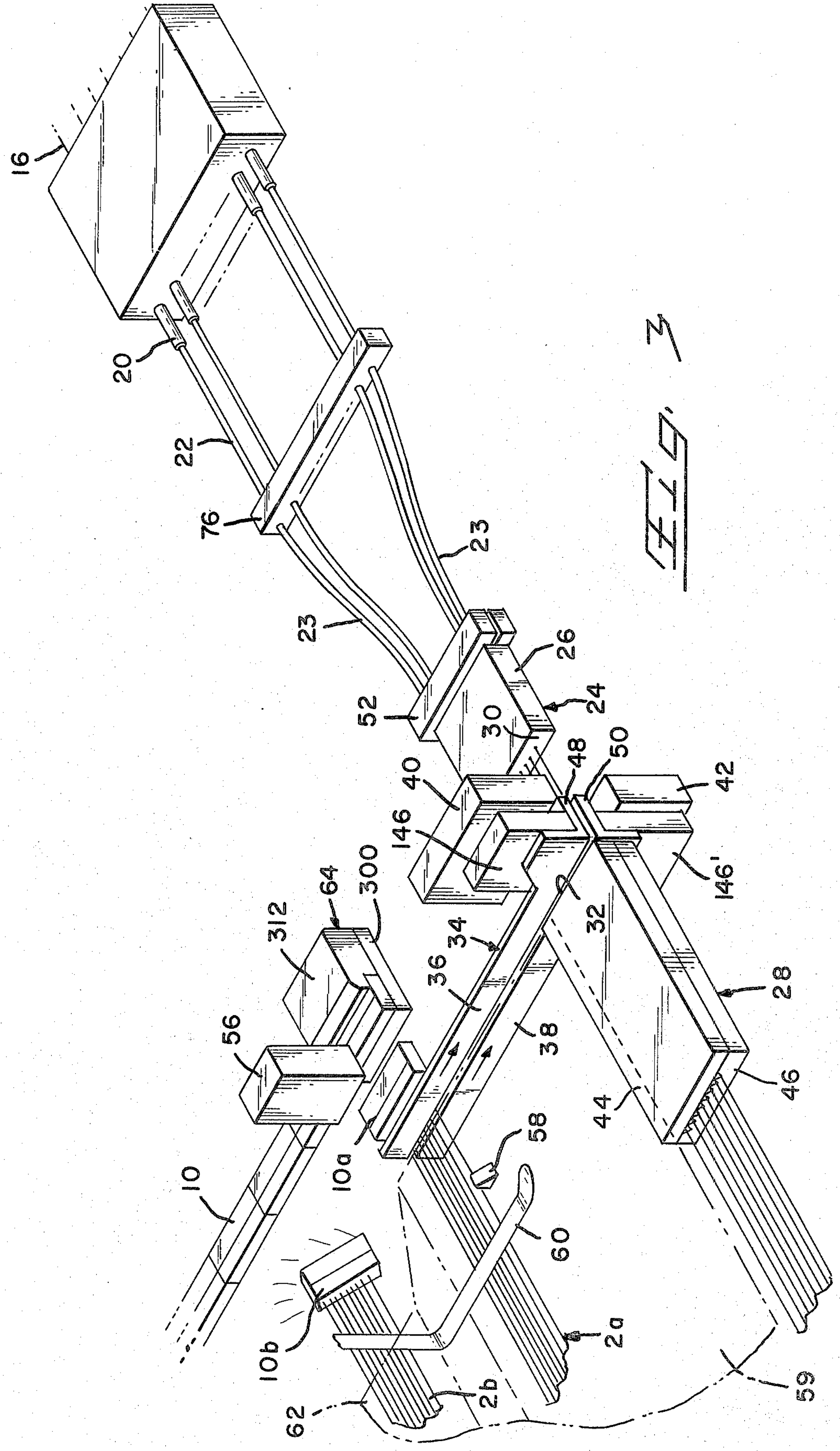
Figure 4:
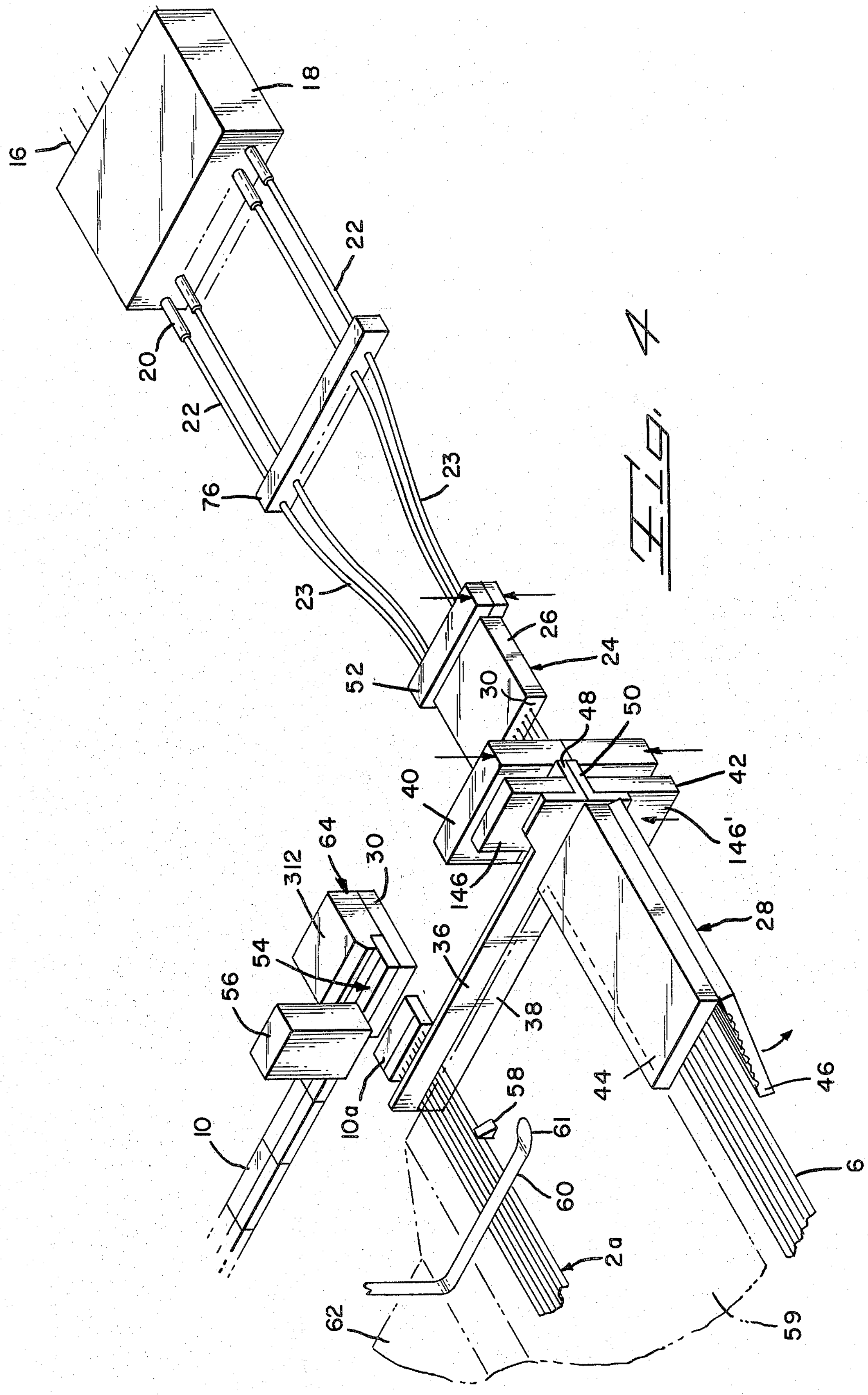

At the beginning of an operating cycle, the opposed ends 30, 32 of the upstream and downstream wire guides 26, 28 are substantially against each other and the wires can therefore be fed through these guides and beyond the ends of the downstream guide. After the wires have been fed through the downstream guides, the guides move relatively away from each other in opposite directions along the wire feed path until they are in the positions of FIG. 2 so that a gap, as indicated at 25, exists between the opposed ends 30, 32 and the wires are exposed in this gap. Portions of the fed wires adjacent to the end 32 of the downstream wire guide 28 are then clamped by a lead clamping and transferring means generally indicated at 34 and comprising upper and lower clamping bars 36, 38. These bars are moved relatively towards and away from each other such that they will clamp the wires when they are substantially against each other, but will be separated to permit their relative movement with respect to the wires of a previously manufactured harness 2A, FIG. 2. As shown in FIG. 3, the clamping bars move into the gap 24 and then move relatively towards each other as shown in FIG. 4, so that the wires are clamped between the wire clamping flanges 48, 50 on the ends of the clamping bars 36, 38. At this stage of the operating cycle, the wire cutters 40, 42 which are normally spaced apart as shown in FIG. 1, move towards each other to cut the wires at a location spaced upstream from the flanges 48, 50 on the clamping bars. The wire cutters preferably have associated therewith, insulation cutting blades which simultaneously cut the insulation on the wires 16 on the upstream side of the plane of wire cutting.

The downstream wire guide 28 is formed from two plates 46, 44 which are hinged together in a manner such that they can be opened and closed. These plates are opened after cutting of the wires so that the lead wires 6 which are produced by the cutting operation can be moved laterally from the wire feed path. The lead clamping and transferring means 34 then moves laterally to the position of FIG. 6 so that the trailing ends of the leads are presented to a wire connecting station 54 which is disposed beside the wire feed path and in alignment with the gap 25. The trailing ends of the leads 6 will at this point extend beyond the flanges 48, 50 of the clamping bars and will be presented to the insertion tooling generally indicated at 56. A connector 10 can then be installed on the trailing ends of the leads to complete manufacture of a harness 2.

Figure 5:
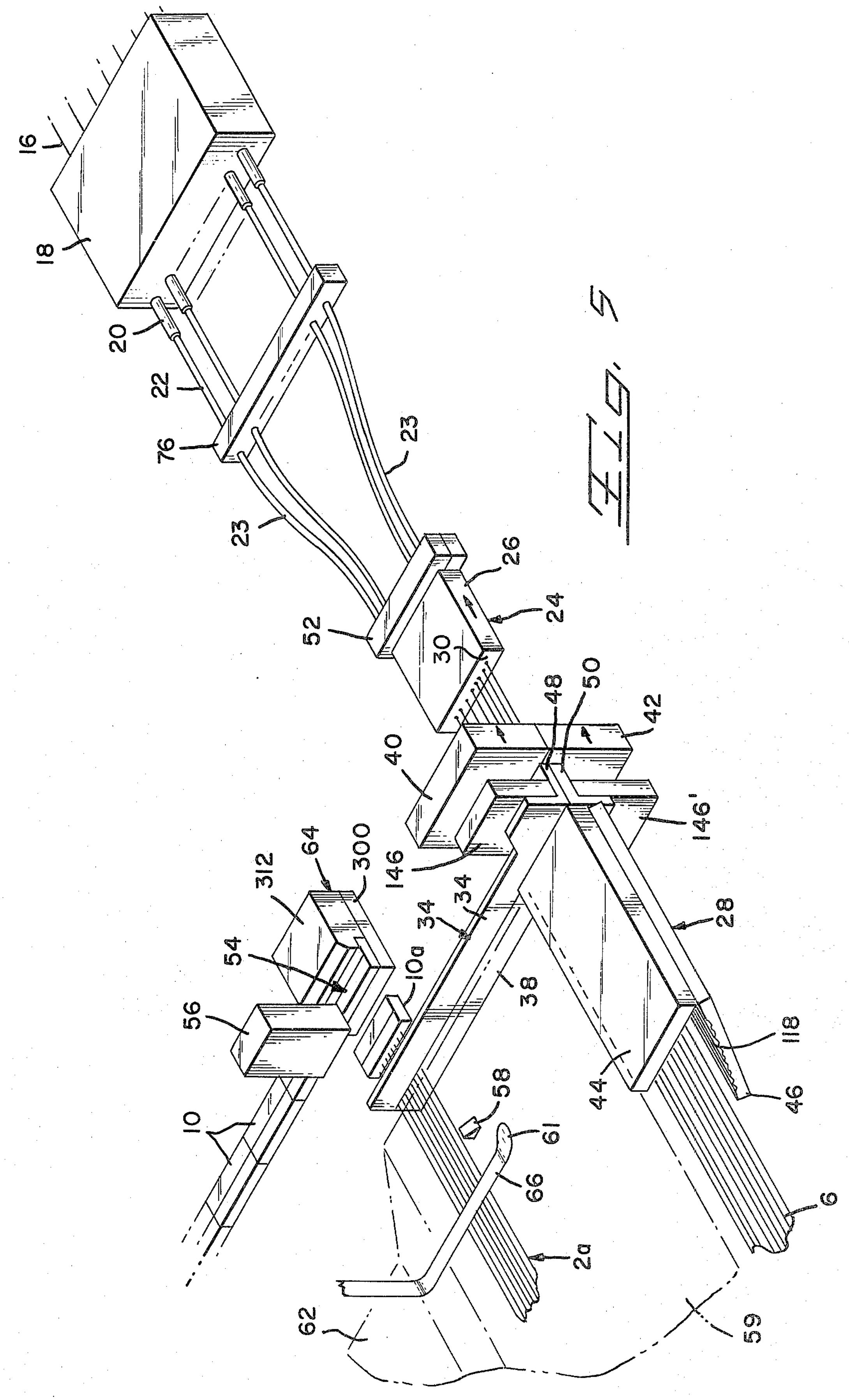

As previously mentioned, the insulation can be stripped from the leading ends of the wires 16 extending from the feeding means 18 and, if desired, the insulation can also be stripped from the trailing ends of the leads adjacent to the plane of cutting. As shown in FIG. 5, the cutting means 40, 42, which contains insulation cutting means adjacent to the wire cutting blades, moves rightwardly after the blades have been closed and it is this motion of the cutting blades which can be used to strip insulation from the trailing ends of the leads 6 if desired. Insulation is stripped from the leading ends of the wires 16 by closing the wire clamp 52 and then moving the wire clamp and the upstream wire guide 26 a further distance away from the upstream insulation cutting blades mounted adjacent to the wire cutting blades. In the disclosed embodiment, insulation is stripped from the ends of the cut wires 16 only and the trailing ends of the leads are not stripped. These trailing ends are connected to terminals in the connector by insulation piercing slots in the terminals in the housing.

The foregoing brief description of the operating principles describes the steps which are followed in the manufacture of a completed harness 2; however, at the beginning of an operating cycle of the apparatus, a completed harness 2A will be in position at the connecting station 54 which was produced during the preceding operating cycle. A second harness 2B will be held between the upper and lower clamping bars 36, 38 at their left hand ends thereof, which harness was produced two cycles before the cycle illustrated in FIG.

Figure 6:
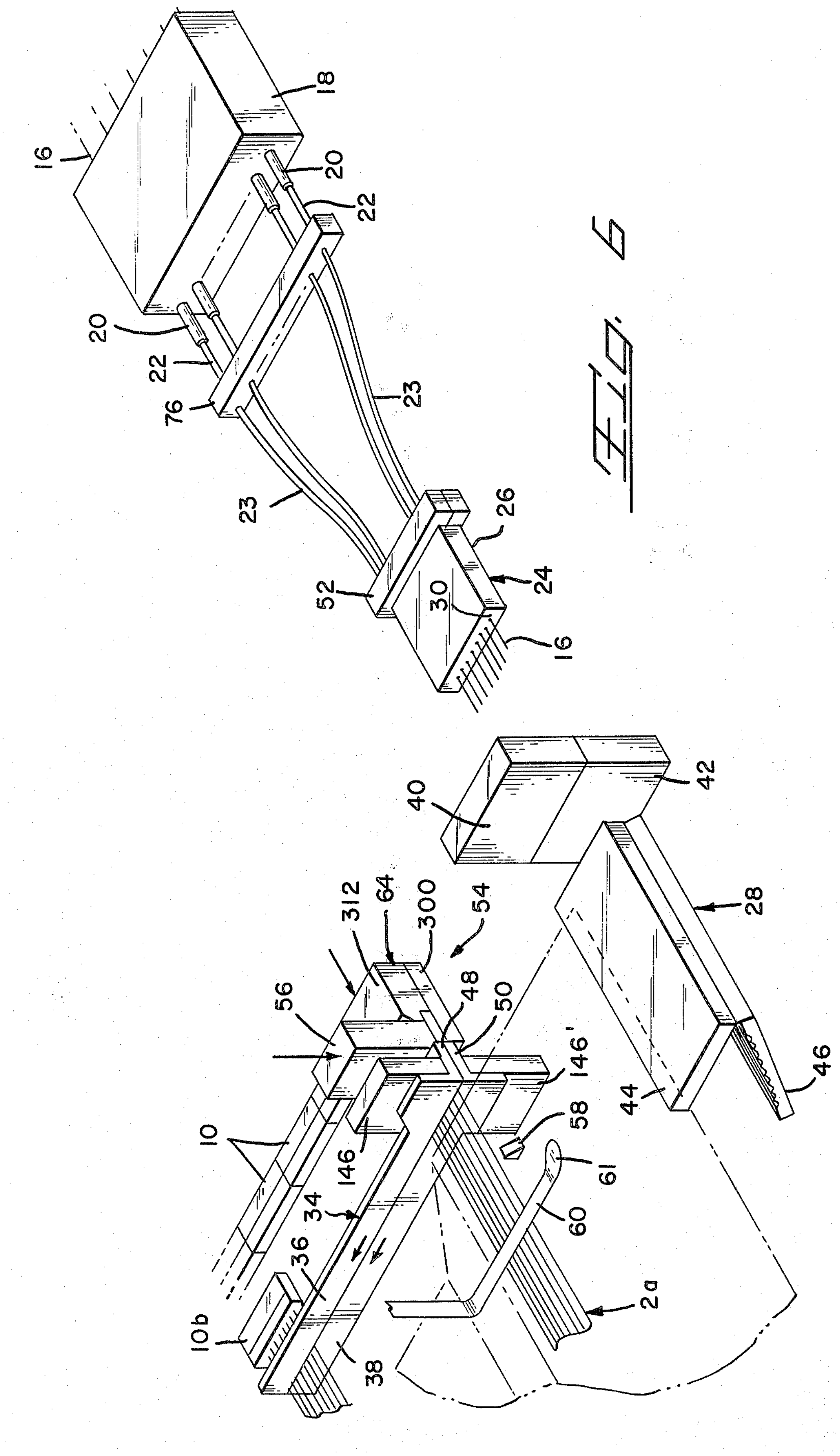
Figure 7:
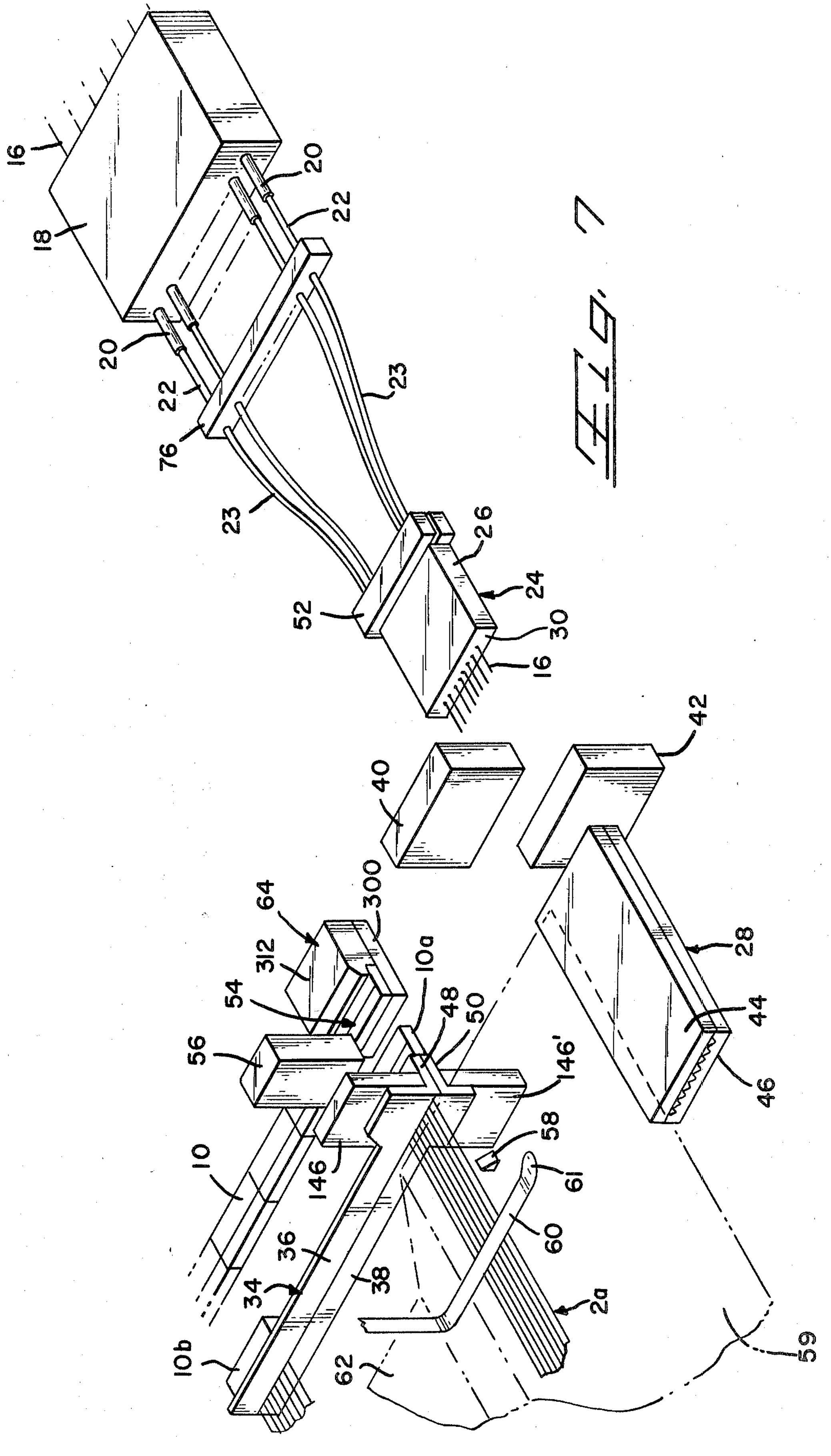
Figure 10:
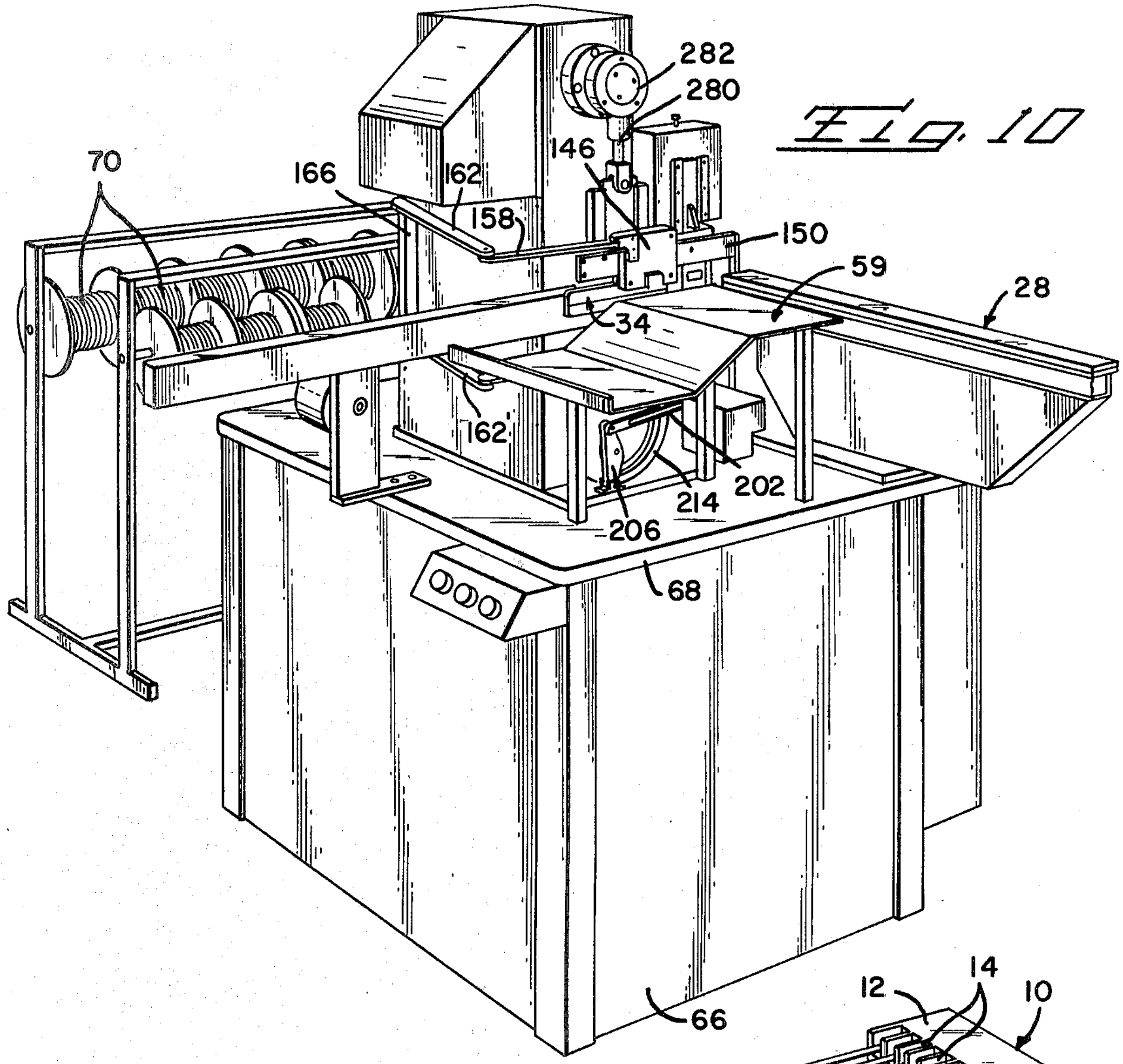
FIG. 10 is a perspective view of an apparatus in accordance with the invention.

1-6. During each operating cycle, the harness 2B will be ejected into a bin area 62 when the clamping bars move apart and then move towards the cutting zone or gap 24. Normally, this harness 2B may fall from between the clamping bars; however, in the event that it does not, it will be knocked into the bin 62 by a knockout bar 60 against which the leads of the harness 2B move when the transferring means moves rightwardly. The harness 2A which is supported on a support surface 59 and which was produced during the immediately preceding operating cycle remains in the connecting station during the operating cycle shown in FIGS. 1-6. It is not dragged rightwardly for the reason that the clamping bars move apart prior to their rightward movement and any tendency of the harness 2A to move rightwardly is thwarted by a stop member 58 positioned on the surface 59. This stop member engages the leads in the harness 2A if they should be dragged towards the feed path by a slight distance. The knockout bar 60 is resiliently biased towards the surface 59 and has upwardly turned end 61 which permits transfer of the leads 6 from the cutting station to the insertion station, as illustrated in FIGS. 5 and 6.

As will be described below, a continuous supply of connector housings 10 is fed to the connecting zone along a housing feed path and the leading connector in the column of connectors is transferred laterally into the connecting station by a transfer means shown in 64.

Figure 9:
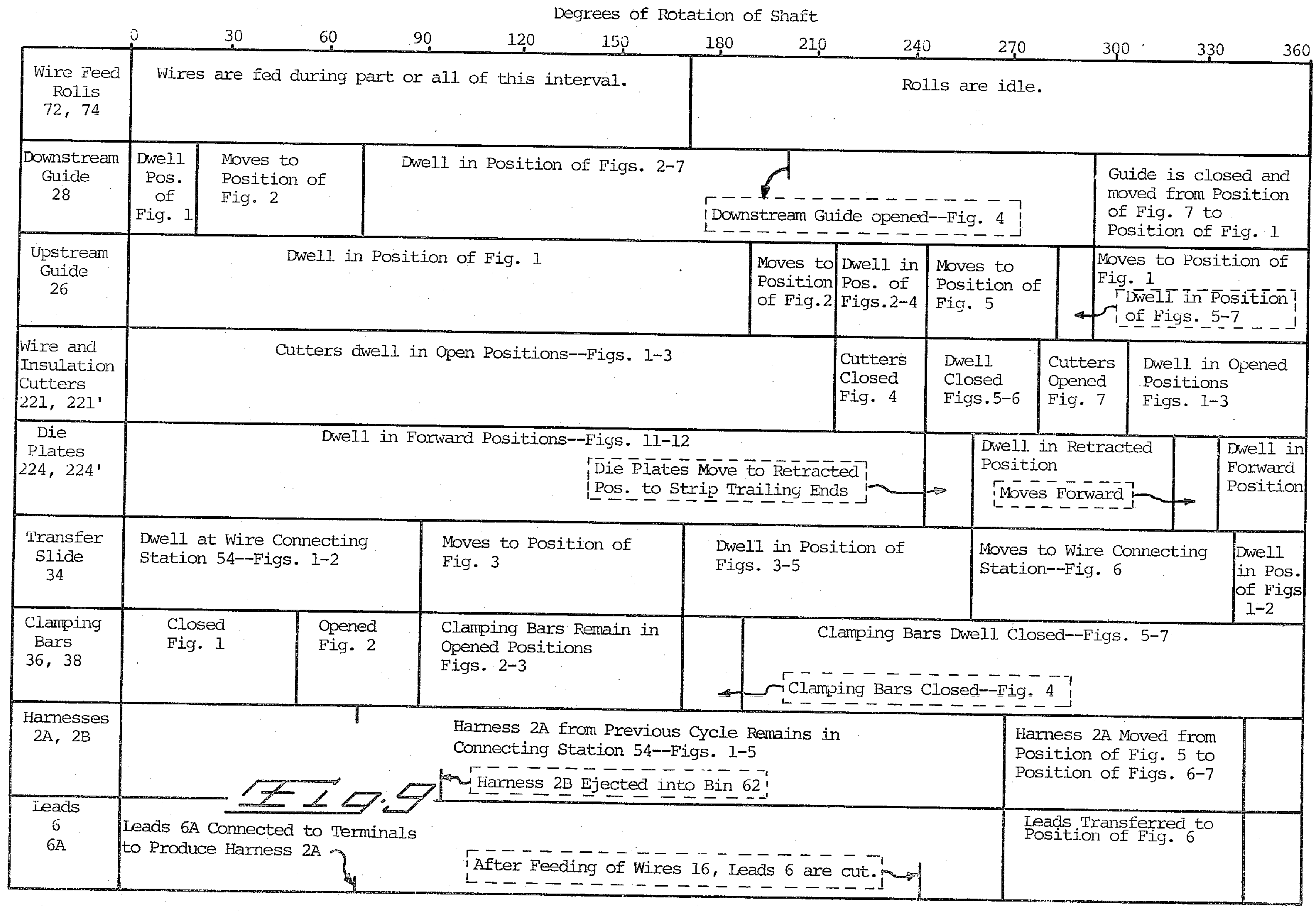
FIG. 9 is a timing diagram of the apparatus.

The timing diagram, FIG. 9, sets forth the timing of the various parts of the apparatus and provides at a glance, the relationships between the movements of all the parts. This timing diagram can therefore be referred to during a reading of the following detailed discussion of the disclosed embodiment for an understanding of the manner in which the movement of the parts are related to each other.

The embodiment described below will ordinarily be supported above the floor by a main horizontal frame plate 68 beneath which there is provided a lower housing containing a main drive motor (not shown) which is coupled to a horizontal shaft 216 (see FIG. 16) by a chain 336 and to a shaft 109 by a chain 107. These shafts operate the mechanisms described below which carry out the operations (excepting wire feed) of the apparatus.

In the following description, the structure for carrying out the different operations is described under specific headings with reference to selected figures of the drawing.

Figure 11:
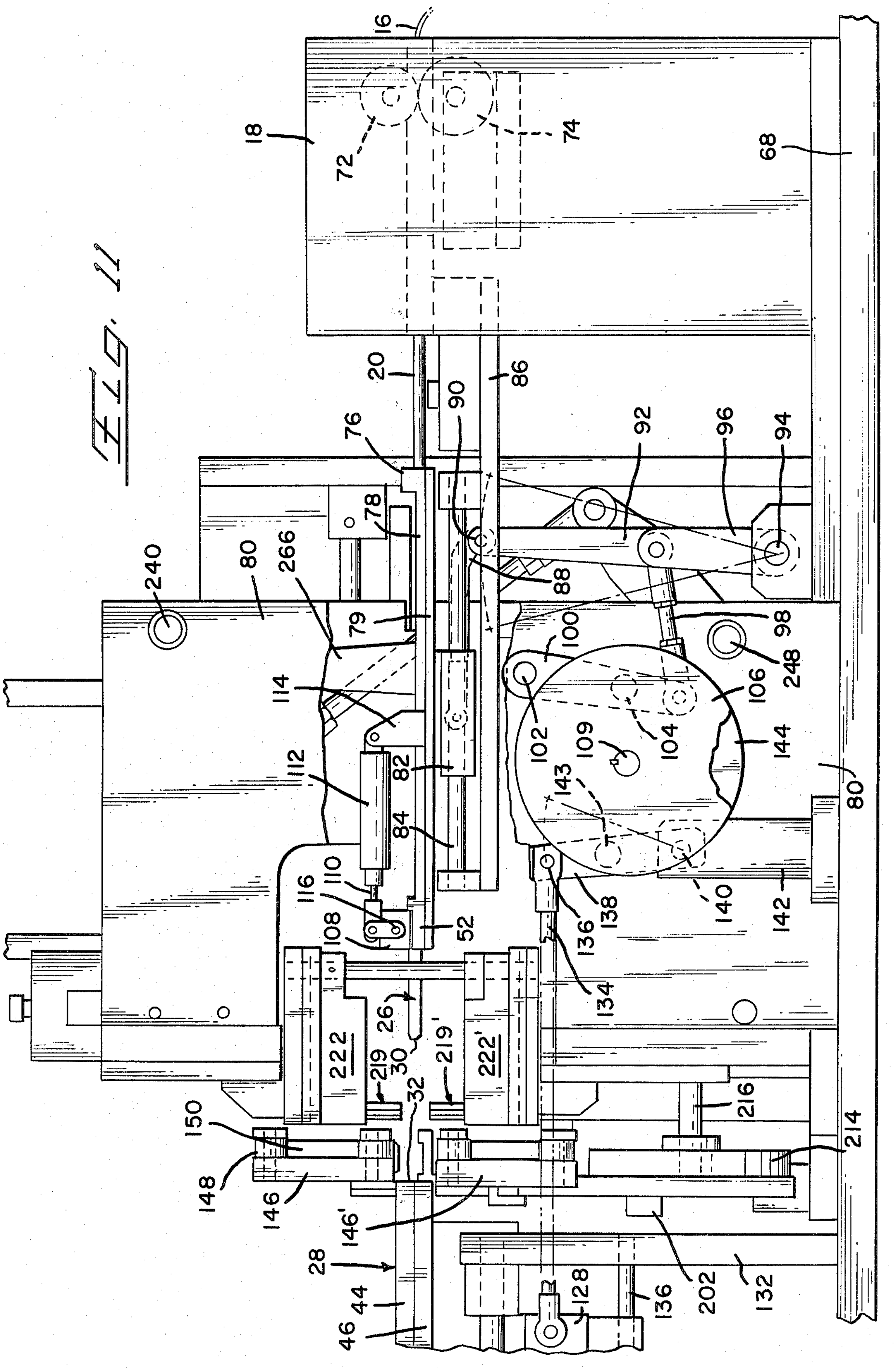
FIG. 11 is a side view with parts broken away showing the conductor feeding means and the wire cutting zone of the apparatus, this view showing the positions of the parts prior to movement of the upstream wire guide to the wire feeding position.
Figure 17:
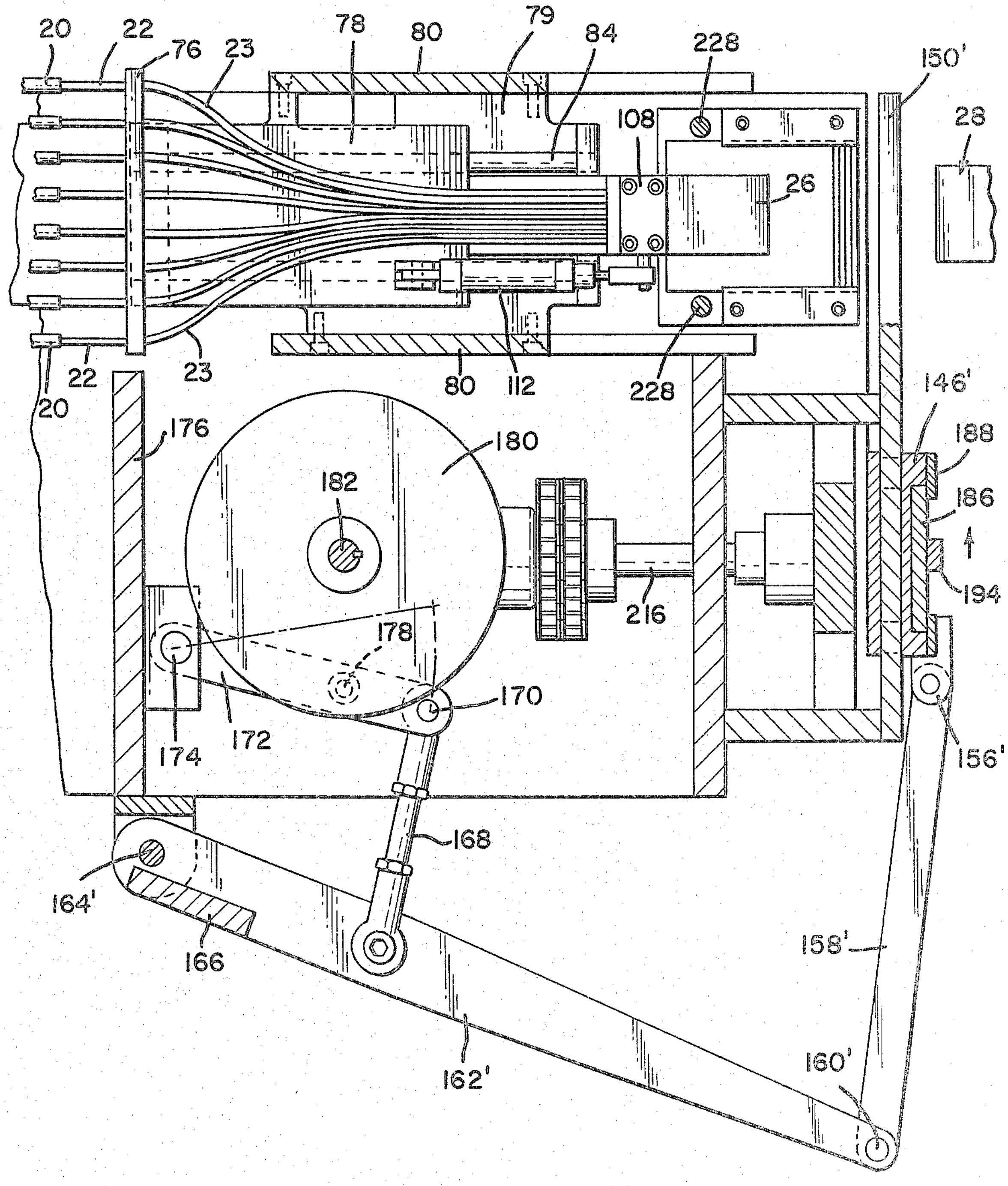
FIG. 17 is a view taken along the lines 17—17 of FIG. 13.

WIRE FEEDING SYSTEM—FIGS. 11 and 17

The feeding means comprises a lower continuously driven feed roll 74 and an individual upper roll 72 for each of the wires 16. As explained in U.S. Pat. No. 4,043,494, the individual rolls 72 are engaged with the wire and the lower driven feed roll 74 for varying time periods which are controlled by the controlling means for the wire feeding system. In this manner, varying wire lengths can be fed to produce a harness having varying lead lengths, as shown in FIG. 8.

The fixed wire guide tubes 20 emerge from the feed mechanism housing 18 on the left hand side thereof, as viewed in FIG. 11, and extend to the movable guide tubes 22 which are telescopically received in the fixed guide tubes in order to permit horizontal movement of the movable guide tubes relative to the fixed guide tubes. Advantageously, a transverse support 76 is provided for the movable guide tubes so that their spacing will be properly maintained. These movable tubes converge towards each other so that the wires are fed through the wire guides with center-to-center spacing between adjacent wires which is the same as the spacing between terminals in the connector housing 10.

The movable guide tubes 22, the clamp 52, and the upstream wire guide 26 are all supported on a horizontal movable support plate 78 which is disposed between vertical frame plates 80 and which is supported by the fixed horizontal plate 79, see FIG. 17. A slide block 82 is integral with the movable plate 78 and is slideably supported beneath the fixed plate on parallel spaced-apart guide rods 84 which are supported above horizontal plate 86. This slide block 82 is reciprocated by a link 88 which is pivoted to the slide block and pivoted at its righthand end at 90 at a vertically extending lever 92 which in turn is keyed or otherwise secured at its lower end to a jack shaft 94 which is supported above the main horizontal frame plate 68. The jack shaft 94 also has keyed thereto a relatively short lever 96, the upper end of which is connected by a connecting rod 98 to the lower end of a lever 100 which is pivoted at its upper end 102 to the horizontal frame plate 80. A cam follower 104 is provided on the lever 100 intermediate its ends and this cam follower is received in a cam track in a cam 106 keyed to a shaft 109. The contour of the cam track on the cam 106 causes oscillation of the arm 96 and the jack shaft 94, and the jack shaft in turn causes oscillation of the lever 92 thereby to move the slideable plate 78 leftwardly from the position shown in FIG. 2, for the feeding operating and then rightwardly after feeding of the wires has been completed. As shown by the timing diagram, the rightward movement of this plate takes place in two stages; the plate is partially retracted to provide clearance for the cutting blades and at a later stage in the operating cycle the plate moves to its fully retracted position to bring about stripping of insulation from the leading ends of the wires which have been cut in the cutting zone.

The upstream wire guide 26 projects leftwardly from the left hand end of the plate 78 and the previously identified wire clamp 52 is mounted on the plate at the left hand end thereof. As shown in FIG. 11, the wire clamp has an upper portion 108 which moves towards and away from the lower portion to clamp and unclamp the wires at the appropriate stages of the operating cycle. Clamping and unclamping of the wires is brought about by a piston rod 110 which extends from a piston cylinder 112 carried by the plate 78 and mounted by suitable supporting ears 114. The piston rod is coupled by means of an eccentric device 116 to the upper part 108 of the clamp in a manner such that movement of the piston rod 110 will raise or lower the upper portion 108 of the clamp by a slight amount. Compressed air supplied to the piston cylinder 112 is controlled by one of the control cams 334 on a cam shaft 332 mounted on the underside of the main frame plate 68, see FIG. 16.

Figure 18:
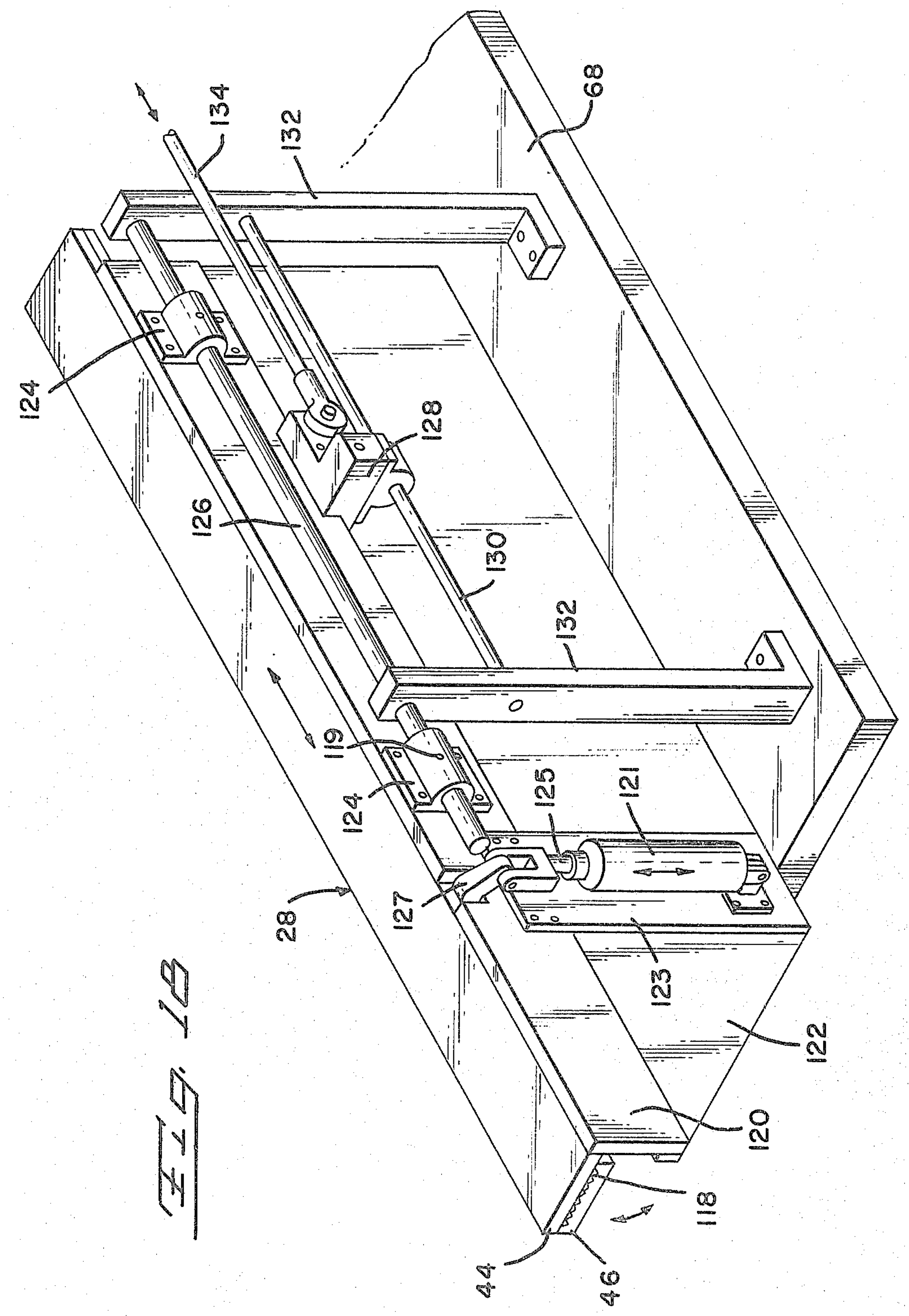
FIG. 18 is a fragmentary perspective view showing details of the downstream wire guide.

DOWNSTREAM WIRE GUIDE—FIGS. 11 and 18

The downstream wire guide 28 comprises two elongated plate-like members 44, 46, hinged to each other so that they can open and release wires which have been previously fed as shown in FIG. 4. The lower member 46 has spaced-apart grooves 118 therein which form confined passageways for guiding the wires through the downstream guide. The upstream guide is, of course, provided with similar passages which are in alignment with the grooves 118 in the downstream guide. As indicated by the timing diagram, the downstream guide moves from its forward position during feeding of the wires through the aligned guides. This movement is possible for the reason that after the wires have been fed from the upstream guide and have entered the downstream guide, it is no longer necessary for the downstream guide to be against the upstream guide and the wires will move through the gap 25 which separates the two guides. This movement of the downstream guide during wire feeding is desirable for the reason that the gripping and transferring means 34 is permitted to move into the gap between the opposed ends of the guides 26, 28 while wire is being fed. The downstream guide is therefore retracted to provide clearance for the transferring slide. This feature of the invention is one of the several instances of overlapping function during operation which permits the achievement of a relatively high production rate for a machine in accordance with the invention.

The movement of the downstream guide 28 in the directions of the arrows in FIG. 18 is achieved by a reciprocable connecting rod 134 which is pivoted at its end to a slide block 128 which is slideably mounted on a rod 130 supported between a pair of upstanding support members 132. The block 128 in turn is fastened to a vertically extending plate 120 which in turn is fastened to the guide 28 by a suitable means. The vertical plate 120 has pillow blocks 124 secured thereto and the blocks 124 in turn are fixed by suitable set screws 119 or the like to a rod 126 which is slideably supported in the upper ends of the vertical support members 132. It will thus be apparent that reciprocation of the connecting rod 134 will result in movement of the same amplitude by the downstream wire guide 28.

Referring now to FIG. 11, the rod 134 is pivoted at its right hand end 136 to a lever 138 which in turn is pivoted at its lower end 140 to a support 142 extending from the frame plate 68. The lever 138 has a cam follower 143 thereon which is received in a cam track in a cam 144, which in turn is keyed to a shaft 109. As indicated in FIG. 11, the cam 144 is behind the cam 106 as viewed in FIG. 11.

The downstream wire guide is opened, as indicated in FIG. 18. by a piston cylinder 121 mounted on a plate 123 which in turn is supported on a plate 122 that extends from the previously identified vertical plate 120. The piston rod 125 of the piston cylinder is coupled by a link 127 to the lower section 46 of the downstream wire guide in a manner such that upward movement of the piston rod will open the downstream guide and permit the previously fed lead wires 6 to be transported laterally to the connecting station 54 as indicated in FIGS. 4 and 5. Compressed air is supplied to the piston cylinder 121 by a suitable valve under the control of a cam on the cam shaft 332 shown in FIG. 16.

LEAD TRANSFER MECHANISM—FIGS. 13-17

Figure 13:
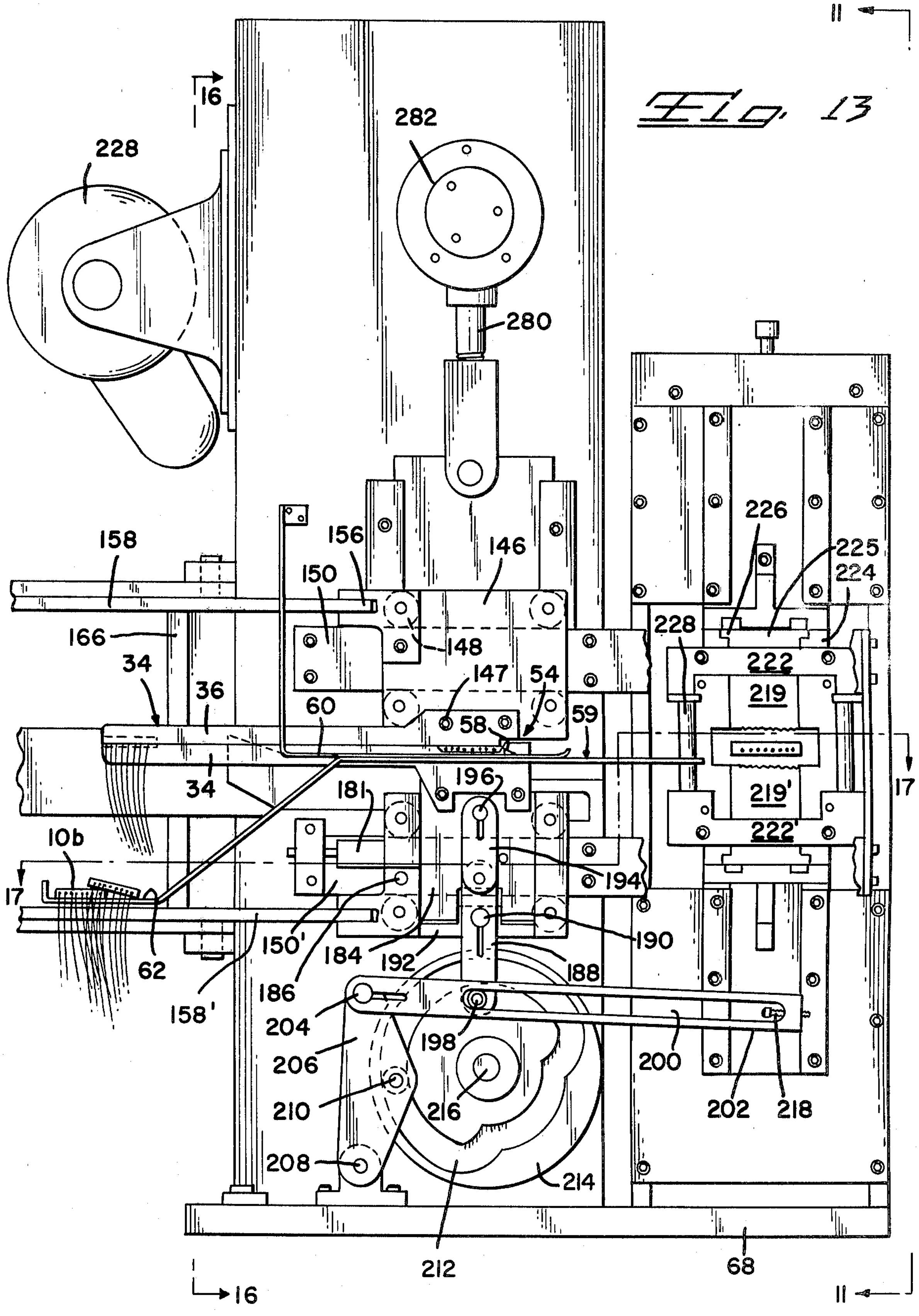
FIG. 13 is a view looking in the direction of the arrows 13—13 of FIG. 12 and showing the wire connecting station and the transferring means for transferring cut leads from the severing station to the connecting station; this view shows the positions of the parts after the cut leads have been transferred to the connecting station.
Figure 14:
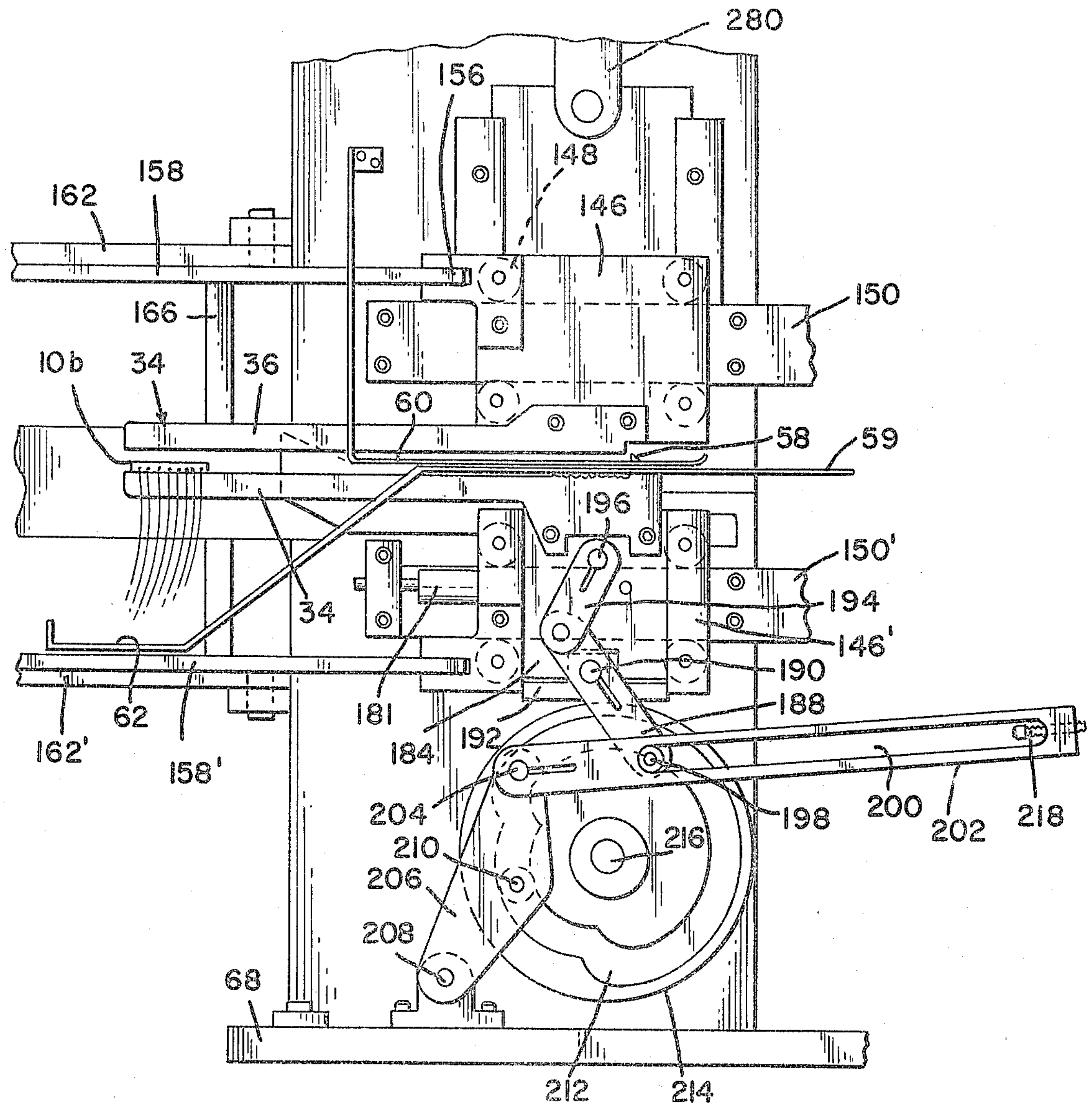
FIGS. 14 and 15 are views similar to FIG. 13 showing the positions of the parts at different stages of the operating cycle.

The upper clamping bar 36 of the lead transferring mechanism 34 is secured by fasteners 147 at its right hand end in FIG. 13 to a plate 146 which has rollers 148 on its rearward surface. These rollers bear against the edges of an upper guide bar 150 that extends from the wire connecting station 54 to the wire cutting station, in other words, to the location of the gap in the wires as shown at 25. The guide bar 150 is supported on the end of a cantilever arm 152, see FIG. 16, which is in turn secured to a vertical frame member 154. The plate 146 can thus move on the guide bar 150 between the wire connecting station, the position in which it is shown in FIG. 13, and the cutting station. The lower clamping bar 38 is secured to a plate 146′ which is supported on a lower guide bar 150′ and while the plates 146, 146′ are similar in many respects, they are not identical and the difference between the two plates will be pointed out below.

Reciprocating motion is imparted to the plates 146, 146′ by links 158, 158′, see FIG. 17. The link 158′ is pivotally connected at 156′ to the plate 146′ and has its other end pivotally connected at 160′ to a lever 162′ which in turn in pivoted at its end 164′. The lever 162′ is rigidly coupled to the upper lever 162 by a vertically extending bar 166 so that motion imported to the lever 162′ will also be imparted to the upper lever 162.

The lever 162′ is oscillated about its pivotal axis 164′ by a connecting rod 168 which is pivoted to the lever at one end and is pivoted at its other end 170 to a lever 172. The lever 172 in turn is pivoted at 174 to a vertically extending frame plate 176 and intermediate its ends the lever 172 has a cam follower 178 thereon. This cam follower is received in a cam track on the underside (as viewed in FIG. 17) of a cam 180 which is keyed to a continuously rotating vertical shaft 182. The cam track on the underside of the cam 180 is contoured to move the two plates and therefore the transferring mechanism 34 from the connecting station to the gap between the guides and to return the clamping mechanism to the connecting station when appropriate during the operating cycle. Movement of this transferring mechanism is shown on the timing diagram.

It is necessary to move the lower clamping bar 38 of the transferring mechanism away from the upper clamp bar 36 prior to rightward travel of the transferring mechanism from the position shown in FIG. 13. The clamp must be opened prior to such movement for the reason that when the transferring mechanism moves, a previously completed harness 2A (FIG. 1) will be located in the connecting station 54. The two clamping bars must move rightwardly from the position of FIG. 1 relatively to the leads extending from this harness and the clamping bars must therefore be separated. Any tendency to drag the leads towards the right during movement of the transferring mechanism is prevented by the stop 58.

The lower clamping bar 38 is fastened to a slide member 184 carried on the lower plate 146′. The slide is confined and guided by gibs 186 and is pulled downwardly and then returned to its raised position by an actuating lever 188 that is pivoted at its upper end to a link 194 which in turn is pivotally connected at 196 to the slide 184. The lever 188 is pivotally connected intermediate its ends at 190 to a block 192 fixed on the plate 146′ and the lower end of the lever 188 has a cam roller 198 thereon which is received in an elongated slot 200 in a control bar 202. The control bar 202 has its left hand end pivoted at 204 to a bellcrank 206, the lower arm of which is pivoted at 208 to a block on the frame plate 68. The bellcrank is provided with a cam follower 210 on its underside which is received in a cam track 212 in a circular plate 214 that is keyed, or otherwise secured, to a shaft 216. The contour of the cam track 212 is such that during a complete rotation of the shaft 216, the slide 184 will be pulled downwardly prior to movement of the transfer means from the connecting station to the wire feed path. The slide 184 will be moved upwardly after arrival of the clamping means on the wire feed path, and the cut leads will remain clamped during return movement of the transfer means. It is desirable to unclamp the wires during insertion of the trailing ends of the leads into the terminals so that the trailing ends will be free to move into the wire receiving slots in the terminals. As shown in FIG. 13, a stop 181 may be provided to limit leftward movement of the plates 146, 146' and a stop is also provided, as shown at 218, in the control bar 200 to limit movement of the cam follower 198.

Figure 12:
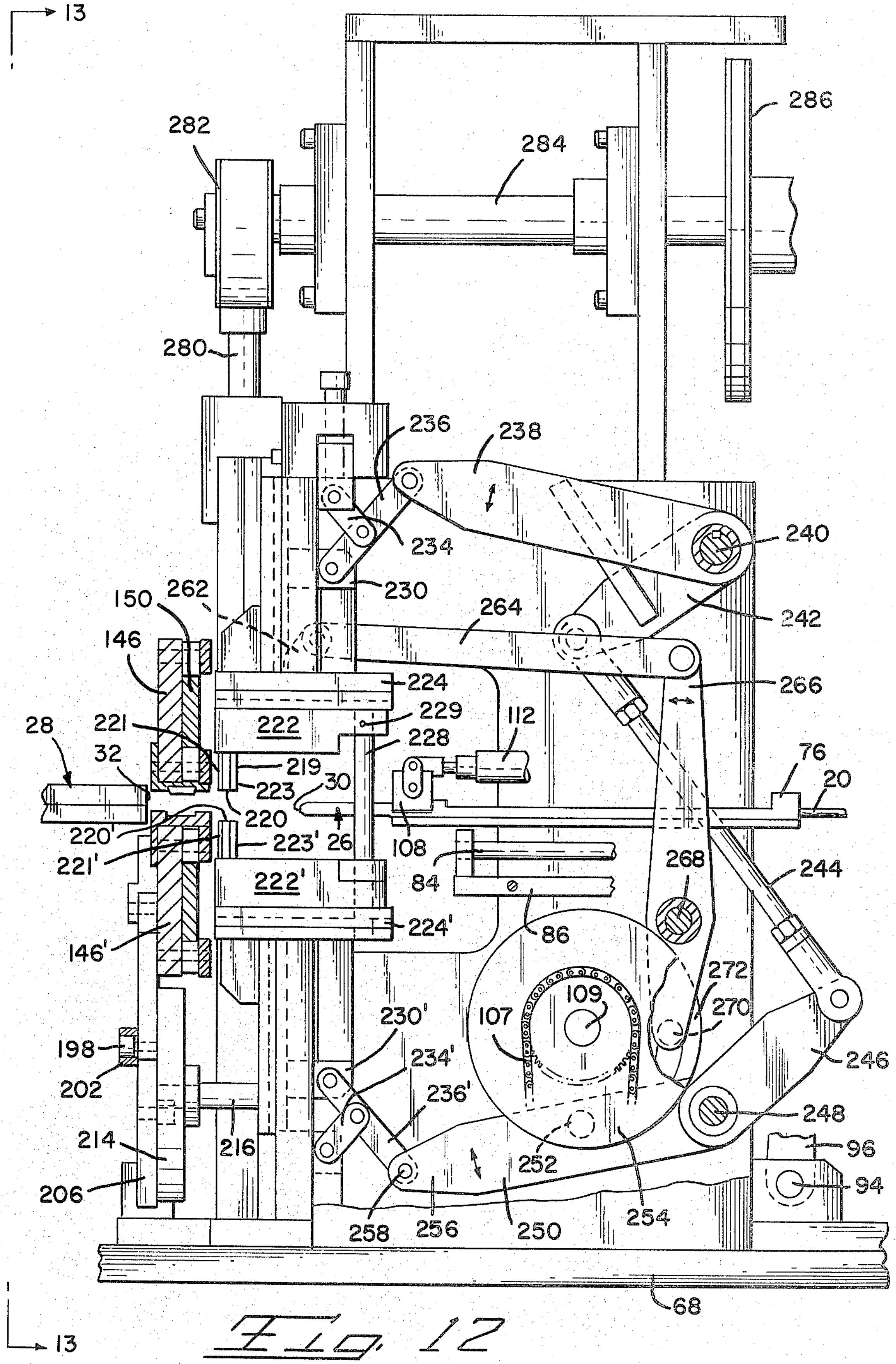
FIG. 12 is a view on an enlarged scale similar to FIG. 11 but showing only the wire cutting zone of the apparatus, parts being broken away in this view to show details of the operating mechanisms.

WIRE SEVERING AND INSULATION CUTTING MEANS—FIGS. 11, 12 and 13

The previously fed wires are cut to produce the leads 6 by opposed upper and lower wire cutting blades 220, 220' which are parts of cutting blade assemblies 219, 219'. In the disclosed embodiment, wire insulation cutting blades 223, 223' are mounted against the wire cutting blades 220, 220' on the right hand sides thereof, as viewed in FIG. 11. When both sets of blades move towards each other, the wires 16 are cut by the wire cutting blades and the insulation of each wire is circumferentially cut by the insulation cutting blades 223, 223' at a location upstream from the plane of wire cutting. The cutting zone or plane of wire cutting 24 is within the gap 25 which is formed when the wire guides move apart. The leading ends of the cut wires are stripped of their insulation by clamping the wires and pulling the wires from between the closed insulation cutting blades. Lead insulation cutting blades can be mounted against the wire cutting blades 220 on the left hand sides thereof at 221, 221' and the motions followed by the apparatus of the disclosed embodiment will cause stripping of the insulation from the trailing ends of the cut leads 6. In the disclosed embodiment, however, it is assumed that the connectors 10 contain terminals having insulation displacement connecting portions and it is therefore not necessary to strip the trailing ends of the leads.

The upper and lower sets of blades are mounted in upper and lower slideable mounting blocks 222, 222' which are mounted on upper and lower die plates 224, 224'. During operation, the die plates 224, 224' move relatively towards each other to their closed positions thereby to cut the wire and cut the insulation adjacent to the plane of wire cutting. The mounting blocks 222, 222' move rightwardly a slight distance relative to the die plates 224, 224' and it is this slight rightward movement of the blocks 222, 222' which can be used to strip insulation from the trailing ends of the cut leads 6.

The upper die plate 224 is moved downwardly upon the straightening of a toggle mechanism 234, see FIG. 12, having one link 236 which is pivotally connected to a vertically slideable block 230. The block 230 in turn is coupled to the upper die plate 224. The link 236 is pivotally connected to a lever arm 238 which is keyed to a shaft 240. This shaft has a shorter arm 242 keyed thereto and the end of the arm 242 is connected by a connecting rod 244, to which it is pivoted, to an arm 246 which is keyed, or otherwise secured, to a shaft 248. A lever 250 is also keyed to the shaft 248 and a cam follower 252 mounted on this lever is received in a cam track in a circular cam 254 which is keyed to a continuously rotating shaft 109. The contour of the cam track on the cam 254 causes the lever 250 to be oscillated thereby causing oscillation of the shaft 248 and the arm 246 with resulting reciprocating movement of the connecting rod 244. The connecting rod 244 causes the arm 242, the shaft 240, and the arm 238 to be oscillated at the appropriate times in the operating cycle to thereby drive the upper die plate downwardly and to retract it after the cut leads have been removed by the transfer device.

The lower die plate 224' is moved upwardly by a corresponding toggle mechanism 234' connected to a slide 230'. The link 236' of this lower toggle mechanism is pivotally connected at 258 to the end 256 of the previously identified lever 250. The lower die plate 224' will therefore move upwardly while the upper die plate is descending.

The limited horizontal motion of the upper and lower slideable mounting blocks 222, 222' is brought about by a link 264 which is coupled to an ear 262 which will be described below. The link 264 is pivotally connected to a lever 266 which is pivoted intermediate its ends at 268 to a vertical frame member and it has on its lower end a cam follower 270 which is received in a cam track of a circular cam 272. The cam track on the cam 272 causes the lever 266 to move in the direction of the arrows shown in FIG. 12 thereby to pull the ear 262 rightwardly and then return the ear to its normal position at the appropriate times in the operating cycle.

The upper and lower tool mounting blocks 222, 222' which carry the upper and lower wire cutting and insulation cutting assemblies 219, 219' are slideably mounted in the upper and lower die plates 224, 224' in a manner which will not be described. The upper mounting block 222 has an integral slide 225, see FIG. 13, on its upper side which has side rails 226 that are received within suitable grooves in the upper die plate 224. The lower mounting block 222' is similarly received in the lower die plate. The two mounting blocks can therefore slide relative to their respective die plates. Motion is transmitted from the upper block 222 to the lower 222' by means of posts 228 which are secured by pins 229 to the upper block 222 and which extend through circular openings in the lower tool mounting block 222'. Slots are provided in the lower die plate 224' to permit motion of these posts rearwardly or rightwardly, as viewed in FIG. 12, relative to the lower die plate. The previously identified ear 262 extends through a suitable slot in the upper die plate 224 so that the motion of the link 264 can be transmitted to the tool mounting blocks.

The tool mounting blocks move relative to the die plates after closing of the cutting and stripping blades, that is, after the die plates have moved towards each other to close the cutting and stripping blades. This motion of the tool mounting blocks result in stripping of the insulation of the trailing ends of the cut leads if desired.

Insulation is stripped from the leading ends of the cut wires 16 by closing the clamp 52 as previously explained, and clamping the wires so that upon further rightward movement of the upstream wire guide 30, the wires will be pulled rightwardly from between the insulation cutting blades on the upstream side of the wire cutting blades 220.

CONNECTING STATION—FIGS. 15 AND 16

The individual leads 6 are connected to the terminals in a housing 10 after they have been positioned over a housing disposed in the connecting station 54 by means of insertion punches 274 which are mounted on the lower end of a slide 276 which is contained in suitable supporting structure, including gibs 278. The slide 276 is reciprocated by a yoke and connecting rod 280 which extends to an eccentric 282 on shaft 284, see FIG. 15, which is coupled by a pulley 286 to a motor 288. The insertion slide 276 is moved downwardly when a single revolution clutch 290 is engaged to drive a shaft through a complete revolution. The actuation of a single revolution clutch 290 may be controlled by one of the cams 334 on the control cam shaft 332, FIG. 16.

Figure 15:
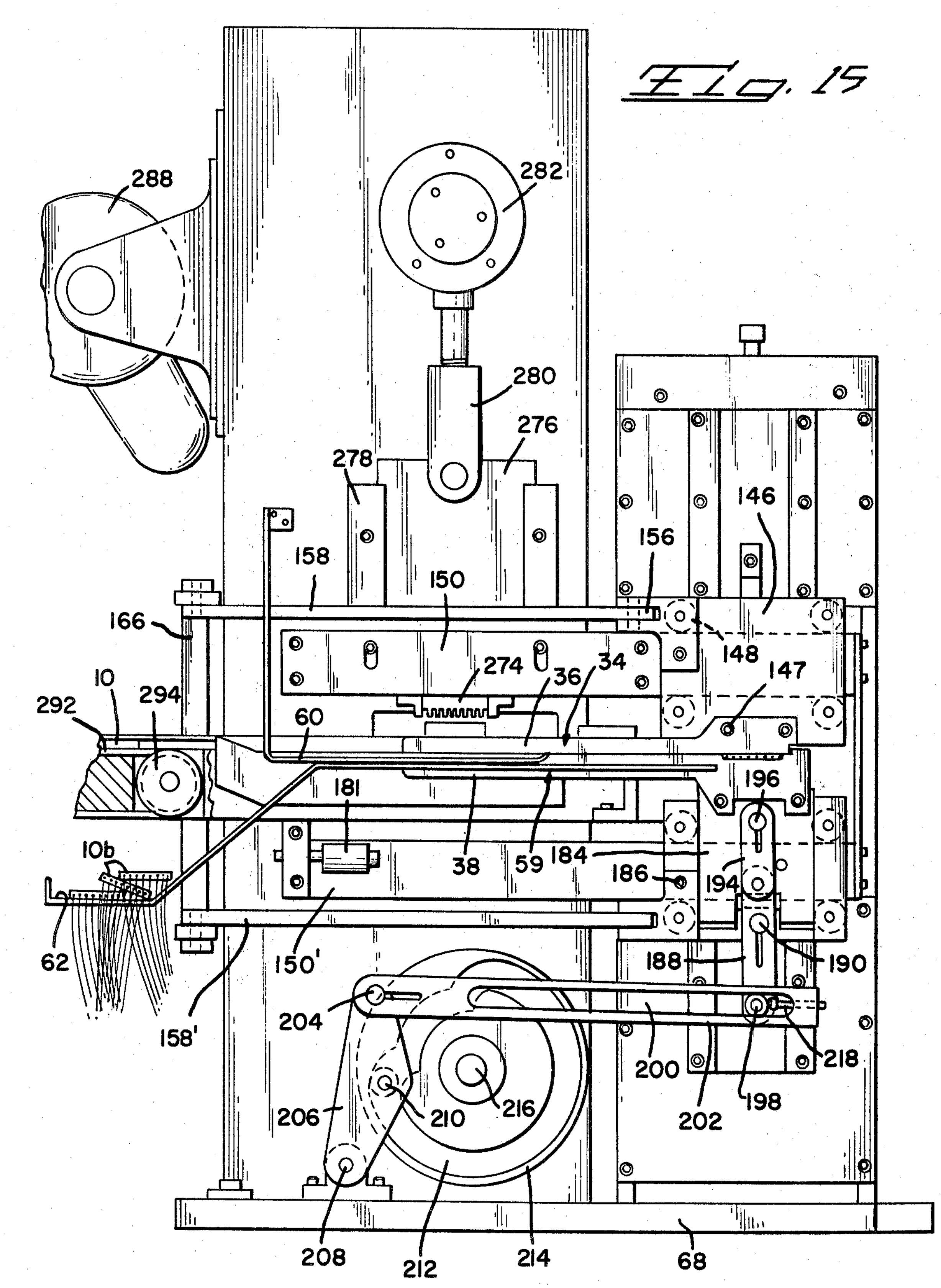

Housings 10 are delivered to the connecting station from a suitable source by means of a continuously moving belt 292 which is driven by a driven pulley 294 and which is between suitable guide plates 296 which confine the housings along a housing feed path that extends towards the connecting station. As shown in FIG. 15, the belt does not extend entirely into the connecting station; however, the path will guide the connectors in front of the belt to the station and the force continually exerted by the belt will position the leading connector housing in alignment with a housing transfer assembly, shown generally at 64, FIG. 16. The housing transfer assembly comprises a lower slide plate 300 and an upper jaw assembly 301 which is pivoted intermediate its ends between ears on the lower slide blade as shown at 314. The slide plate 300 has a leading end 302 which moves under the leading housing 10 at the end of the housing feed path and which shifts this housing rightwardly as viewed in FIG. 16, to the phantom line position at which the terminals in the housing will be beneath the trailing ends of the lead wires 6 and beneath the insertion punches. Movement of the slide plate 300 and the entire assembly 64 is brought about by a cam 310 on the vertical shaft 182. This cam has a cam track on its underside and a follower 308 on the left hand end of the plate is received in this cam track. The housing transfer assembly 64 is guided by suitable guiding means indicated at 304.

The upper jaw assembly 301 is pivotally mounted intermediate its ends on the upper surface of the slide plate 300 as shown at 314. The right hand end 312 of the upper jaw assembly is recessed from the leading end 302 of the plate 300 and is also contoured such that a housing will be gripped between the end of the upper jaw assembly 312 and the surface of the leading end 302 of the slide plate. The upper jaw assembly 301 is swung slightly upwardly when the leading housing on the housing feed path is picked up and then is moved in a clockwise direction to the position shown in FIG. 16 thereby to clamp the housing 10 while it is being transferred from the housing feed path to a position beneath the insertion punches, that is, while it is being transferred to the phantom line position of FIG. 16.

The upper jaw assembly is normally biased in a counter-clockwise direction relative to its pivotal axis 314 by a suitable spring 316 located rightwardly of the pivotal axis 314. Pivotal movement of the assembly 301 is controlled by a cam 332 keyed to the shaft 182 above the previously identified cam 310. The upper surface of the cam 332 is engaged by a cam follower 330 which is mounted on a lever 326. This lever is pivoted at its end 328 to a vertical frame plate and has on its right hand end, as viewed in FIG. 16, a horizontal plate 320 which extends beneath a roller 318 which is mounted on the left hand end of the upper jaw assembly 301. The contour of the upper surface of the cam 332 is such that when the lever 326 is swung through a slight colockwise arc, the plate 320 will be swung downwardly from the position shown in FIG. 16 thereby permitting the spring 316 to swing the jaw assembly 301 through a counter-clockwise arc thereby to raise the forward portion 312 from the position shown in FIG. 16. The jaw assembly is maintained in this position while the slide plate 300 moves rightwardly and engages the leading housing on the housing feed path. When the leading housing is positioned on the forward end 302 of plate 300, cam 332 causes lever 326 to swing through a slight counter-clockwise arc thereby swinging the jaw assembly 301 through a clockwise arc and causing the housing to be gripped or clamped between the leading ends 312, 302 of the upper jaw assembly and the slide plate.

Figure 16:
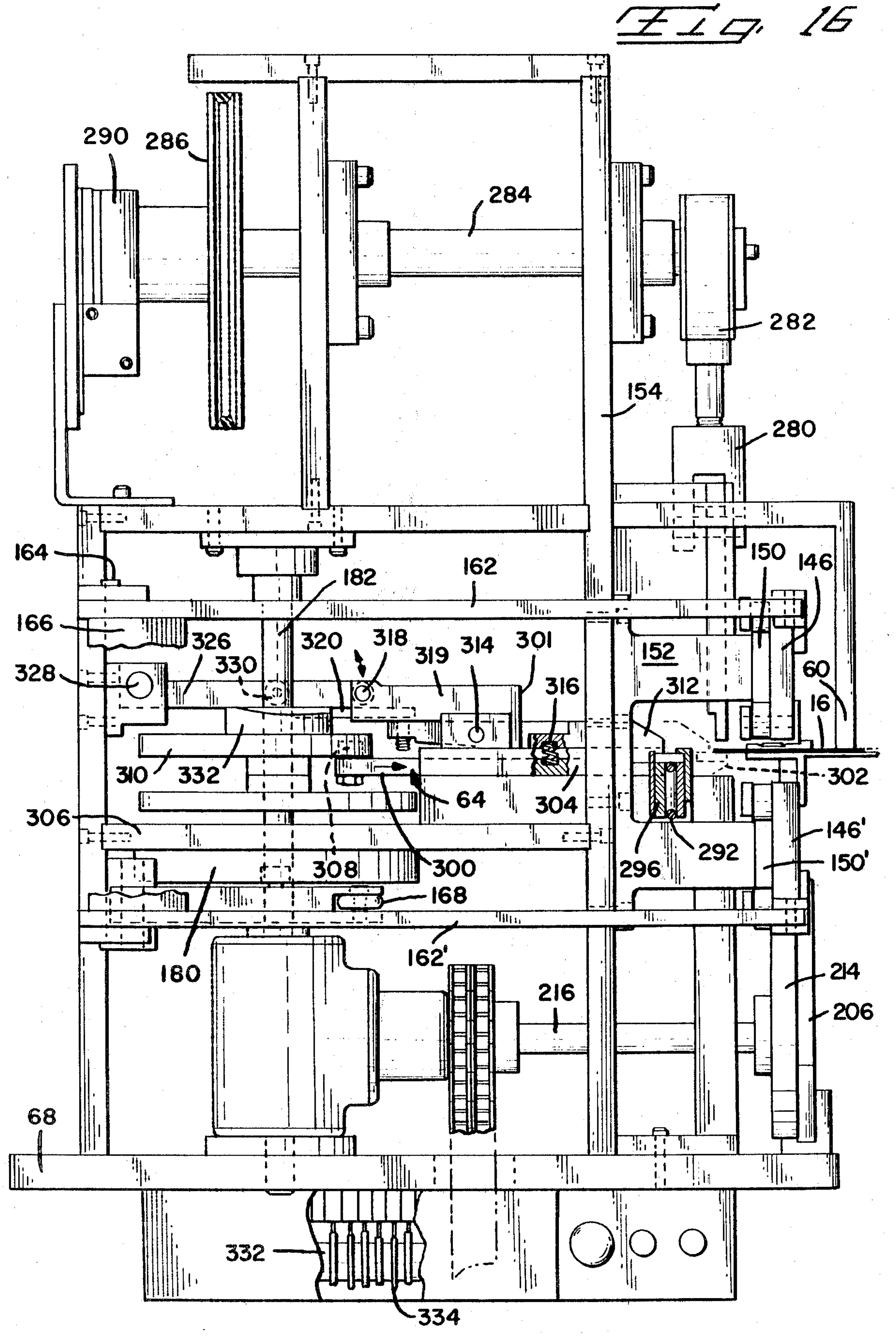
FIG. 16 is a view looking in the direction of the arrows 16—16 of FIG. 13.

The housing remains clamped until the leads have been inserted into the terminals in the housing and the upper jaw assembly is then swung through a slight counter-clockwise arc thereby releasing the housing while the slide plate moves leftwardly from the position shown in FIG. 16. The housing, to which the trailing ends of the leads have now been attached, dwells at the connecting station until it is transferred to the receiving bin as described elsewhere.

It is believed that the operation of the disclosed embodiment will be apparent from the foregoing description taken in conjunction with the timing diagram, FIG. 9, and the description of the operating principles of the apparatus set forth above at the beginning of this specification. Significant advantages are achieved by apparatus in accordance with the invention and by the method of manufacturing harnesses of the invention by virtue of the fact that many of the operations carried out in the process overlap so that a given operation need not be delayed until previous operations have been completed. For example, wire feeding will take place during a substantial portion of the operating cycle, approximately 170° of the rotation of the shaft 182. This relatively long wire feed interval permits the feeding of substantial lengths of wire where required, particularly if a wire feed as disclosed in the above U.S. Pat. No. 4,043,494 is employed. The wire feeding portion of the cycle may commence prior to the insertion of the trailing ends of the leads from the previous operating cycle into a connecting housing at the connecting station. Thus, the wire feeding portion of the cycle need not be delayed until completion of the wire insertion process as is required in making known types of harness making machines.

All of the operations required for cutting of the previously fed wires and stripping of the insulation from the leading ends of the cut wires and the trailing ends of the leads are carried out within a fairly short portion of the operating cycle and these operations do not interfere with, nor are they affected by, the wire-connecting operations involving the insertion press.

The disclosed embodiment further has means for transporting finished harnesses from the connecting station in that the clamping jaws 36, 38 move the finished harness leftwardly towards the receiving bin 62 while recently cut leads are being transported from the cutting zone to the connecting station. As illustrated by FIG. 1, a harness from the second preceding cycle will be gripped between the jaws at the beginning of a given operation cycle and this harness is ejected into the bin 62 by the knockout bar 60.

Figure 8A:
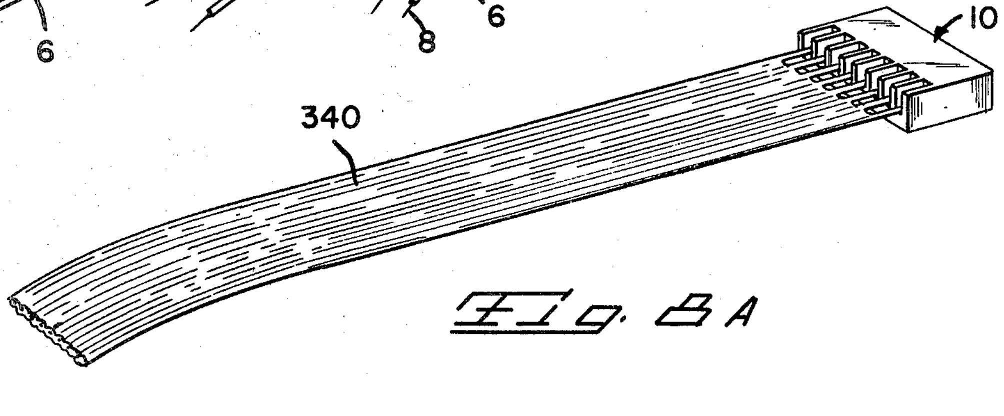
FIG. 8A is a perspective view of a harness having a flat cable extending from the connector.

The principles of the invention can be employed when harnesses are being made with flat cable 340, as shown in FIG. 8A. If the type of harness shown in this figure is being produced, the cable is simply fed from a reel or the like, and is notched, as well as cut in the cutting station, by suitable tooling affixed to the upper and lower die plates 224, 224'. If cable is being run through the apparatus, stripping of the cable ends may or may not be carried out as desired.

What is claimed is:

1. Apparatus for serially manufacturing electrical harnesses of the type comprising at least one multi-contact electrical connector and a plurality of electrical contact terminals therein, said terminals being arranged in side-by-side relationship in a row, each of said conductors being connected to one of said terminals in a conductor connecting portion of said one terminal, said apparatus being of the type having feed roll means for feeding a plurality of conductors in side-by-side coplanar relationship along a conductor feed path, a cutting station on said conductor feed path, said cutting station being located downstream, relative to the direction of conductor feed, from said roll means, and a conductor connecting station proximate to said cutting station, said conductor connecting station being spaced laterally from said conductor feed path, and having connecting means for connecting conductors to terminals in a connector positioned in said connecting station, said apparatus being characterized in that:

said apparatus has upstream and downstream conductor guides proximate to said cutting station, said upstream guide extending upstream from said cutting station and said downstream wire guide extending downwstream from said cutting station, said upstream and downwstream guides having opposed ends, said guides being relatively movable parallel to said conductor feed path between adjacent positions and remote positions, said opposed ends of said guides being substantially against each other when said guides are in said adjacent positions and being separated from each other by a gap when said guides are in said remote positions, severing means in said cutting station comprising normally open severing blades located in a plane which extends normally of said conductor feed path and which lies within said gap, said severing blades being movable to a closed position to cut said conductors and thereby produce a plurality of leads having their trailing ends in said gap and extending through said downstream guide, trailing end transferring means having clamping means for clamping the conductors in side-by-side coplanar relationship, the trailing end transferring means being movable along a transfer path which intersects the conductor feed path in the gap and and extends to the connecting station and actuating and control means effective during each operating cycle to position said guides in said adjacent positions to thereafter actuate said feed roll means thereby to feed said conductors along said feed path, to thereafter move said guides to said remote positions, to thereafter cause said transferring means to move into said gap between said opposed ends of said guides and clamp said conductors to thereafter close said severing blades and cut said conductors, to thereafter transfer said trailing ends of said leads to said connecting station, and thereafter to actuate said connecting means to connect said trailing ends to said terminals in said connector and thereby produce one of said harnesses.

2. Apparatus as set forth in claim 1, said conductors comprising discrete wires.

3. Apparatus as set forth in claim 1, said conductors comprising side-by-side coplanar conductors in a flat multi-conductor cable.

4. Apparatus as set forth in either of claims 2 or 3, said connecting means at said connecting station comprising insertion means for inserting said trailing ends of said leads into conductor receiving portions of said terminals.

5. Apparatus as set forth in claim 4, said trailing end transferring means being reciprocable between said cutting station and said connecting station.

6. Apparatus as set forth in claim 5, said apparatus having harness transferring means for transferring, during each operating cycle of said apparatus, a finished harness from said connecting station further along said transfer path.

7. Apparatus as set forth in claim 6, said actuating and control means being effective, during each operating cycle of said apparatus, to actuate said connecting means at said connecting station during feeding of said conductors by said feed roll means.

8. Apparatus as set forth in claim 1, said downstream conductor guide being movable away from said upstream conductor guide.

9. Apparatus as set forth in claim 8, said actuating and control means being effective in moving said downstream conductor guide away from said upstream conductor guide feeding of said conductors.

10. Apparatus for serially manufacturing electrical harnesses of the type comprising at least one multi-contact electrical connector and a plurality of lead wires, said connector having a plurality of electrical contact terminals therein, said terminals being arranged in side-by-side relationship in a row, each of said wires being connected to one of said terminals in a wire connecting portion of said one terminal, said apparatus being of the type having feed roll means for feeding a plurality of wires in side-by-side coplanar relationship along a wire feed path, a wire cutting station on said wire feed path, said cutting station being located downstream, relative to the direction of wire feed, from said roll means, and a wire connecting station proximate to said wire cutting station for connecting wires to terminals in a connector positioned in said connecting station, said apparatus being characterized in that:

said apparatus has upstream and downstream wire guides proximate to said wire cutting station, said upstream wire guide extending upstream from said cutting station and said downstream wire guide extending downstream from said cutting station, said upstream and downstream guides having opposed ends, said guides being relatively movable parallel to said wire feed path between adjacent positions and remote positions, said opposed ends of said guides being substantially against each other when said guides are in said adjacent positions and being separated from each other by a gap when said guides are in said remote positions, each of said guides having a plurality of wire guiding passageways extending therethrough for confining and guiding said wires, severing means in said cutting station comprising normally open severing blades located in a plane which extends normally of said wire feed path and which lies within said gap, said severing blades being movable to a closed position to cut said wires and thereby produce a plurality of leads having their trailing ends in said gap and extending through said downstream wire guide, said wire connecting station being beside said wire feed path and in alignment with said gap, lead transferring means having a wire clamp for clamping said trailing ends of said leads and moving said leads laterally of said wire feed path along a transfer path which extends to said connecting station whereby said trailing ends are presented to said connecting station, said downstream wire guide having guide opening means for opening said downstream wire guide thereby to permit said lead transferring means to move said leads along said transfer path, and actuating and control means effective during each operating cycle to position said wire guides in said adjacent positions, to thereafter actuate said feed roll means thereby to feed said wires along said wire feed path, to thereafter move said wire guides to said remote positions, to thereafter cause said transferring means to move into said gap between said opposed ends of said guides and clamp said wire, to thereafter close said severing blades and cut said wires, to thereafter open said downstream wire guide and actuate said transfer means to transfer said trailing ends of said leads to said connecting station, and to thereafter actuate said connecting means to connect said trailing ends to said terminals in said connector and thereby produce one of said harnesses.

11. Apparatus as set forth in claim 10, said connecting means at said wire connecting station comprising insertion means for inserting said trailing ends of said leads into wire connecting portions of said terminals.

12. Apparatus as set forth in claim 10, said lead transferring means being reciprocable between said wire cutting station and said wire connecting station.

13. Apparatus as set forth in claim 12, said apparatus having harness transferring means for transferring, during each operating cycle of said apparatus, a finished harness from said connecting station further along said transfer path.

14. Apparatus as set forth in either of claims 10 or 13, said feed roll means being of the type comprising an individual set of feed rolls for each of said wires and having feed roll control means for controlling said sets of individual feed rolls individually whereby said electrical harnesses can be produced with leads of varying lengths.

15. Apparatus as set forth in claim 14 having wire stripping means in said wire cutting station for stripping insulation from the leading ends of wires extending through said upstream wire guide after closing of said severing blades.

16. Apparatus as set forth in claim 14 having connector feeding means for feeding a connector to said wire connecting station during each operating cycle of said apparatus.

17. Apparatus as set forth in claim 13, said lead transferring means and said harness transferring means comprising a single set of coextensive jaws having a length which is at least equal to the distance between said connecting station and said cutting station, said set of jaws having lead gripping portions at one end thereof and harness gripping portions at the other end thereof, said jaws being reciprocable along said transfer path whereby said lead gripping portions move between said cutting station and said connecting station, and said harness gripping portions move between said connecting station and a harness discharge station which is spaced from said connecting station.

18. A method of serially manufacturing electrical harnesses of the type comprising a least one multi-contact electrical connector and a plurality of conductors, said connector having a plurality of electrical contact terminals therein, said terminals being arranged in side-by-side relationship in a row, each of said conductors being connected to one of said terminals in a conductor connecting portion of said one terminal, said method comprising the steps of:

feeding a plurality of said conductors in side-by-side coplanar relationship along a conductor feed path through upstream and downstream, relative to the direction of conductor feed, conductor guides which are against each other, moving said conductor guides relatively away from each other along said conductor feed path thereby forming a gap between said guides with said conductors extending across said gap, gripping said conductors in said gap at a location proximate to said downstream guide and severing said conductors at a location between said upstream guide and the location at which said conductors are gripped, transferring the severed lead conductors laterally of their axes to a connecting station and connecting the cut ends of said conductors to terminals in a connector at said connecting station.

19. The method set forth in claim 18 including the step of commencing the feeding of said conductors during each operating cycle while said lead conductors from the preceding operating cycle are being connected to terminals in said connecting station.

20. The method set forth in claim 19 in which said conductors are contained in a flat cable.

21. The method set forth in claim 19 in which said conductors are discrete wires.

22. The method set forth in claim 20 including the step of stripping the cut ends of said wires adjacent to said upstream guide.

23. The method set forth in claim 21 in which said wires are fed individually along by individual sets of feed rolls and said sets of rolls are individually controlled during feeding to produce conductors of varying lengths in said harness.

* * * * *